United States Patent
Jaeckel et al.

(10) Patent No.: US 12,495,812 B2
(45) Date of Patent: Dec. 16, 2025

(54) LIPASES, COMPOSITIONS, METHODS AND USES THEREOF

(71) Applicant: Chr. Hansen A/S, Hoersholm (DK)

(72) Inventors: Christian Jaeckel, Hoersholm (DK); Hans Raj, Hoersholm (DK)

(73) Assignee: Chr. Hansen A/S, Hoersholm (DE)

( * ) Notice: Subject to any disclaimer, the term of this patent is extended or adjusted under 35 U.S.C. 154(b) by 638 days.

(21) Appl. No.: 17/798,153

(22) PCT Filed: Feb. 26, 2021

(86) PCT No.: PCT/EP2021/054825
§ 371 (c)(1),
(2) Date: Aug. 8, 2022

(87) PCT Pub. No.: WO2021/170799
PCT Pub. Date: Sep. 2, 2021

(65) Prior Publication Data
US 2023/0098388 A1 Mar. 30, 2023

(30) Foreign Application Priority Data

Feb. 28, 2020 (EP) .................................... 20160150
Aug. 31, 2020 (EP) .................................... 20193597

(51) Int. Cl.
| | | |
|---|---|---|
| C12N 9/20 | (2006.01) | |
| A23C 9/12 | (2006.01) | |
| A23C 13/16 | (2006.01) | |
| A23C 15/12 | (2006.01) | |
| A23C 19/032 | (2006.01) | |
| A23C 20/00 | (2006.01) | |

(52) U.S. Cl.
CPC ........ *A23C 19/0328* (2013.01); *A23C 9/1216* (2013.01); *A23C 13/16* (2013.01); *A23C 15/123* (2013.01); *A23C 20/00* (2013.01); *C12N 9/20* (2013.01); *C12Y 301/01003* (2013.01)

(58) Field of Classification Search
CPC .............................. A23C 19/0328; C12N 9/20
See application file for complete search history.

(56) References Cited

U.S. PATENT DOCUMENTS

2023/0098388 A1* 3/2023 Jaeckel .............. A23C 19/0328
435/134

FOREIGN PATENT DOCUMENTS

| EP | 3 081 644 A1 | 10/2016 |
|---|---|---|
| WO | WO-2010/102976 A1 | 9/2010 |
| WO | 2015087833 A1 | 6/2015 |

OTHER PUBLICATIONS

EMBL Database [Online]; Apr. 22, 2012, "Yarrowia lipolytica isolate MSR80 lipase 14 (Lip14) mRNA, complete cds.", XP055702757, retrieved from EBI accession No. EM_STD:JQ396259 Database accession No. JQ396259 sequence; 1 page.
Uniprot Database [Online]; Jun. 13, 2012, "Lipase 14 from Yarrowia lipolytica (EMBL:AFH77829.1)", XP055702747, retrieved from EBI accession No. UNIPROT:I0CKV2 Database accession No. I0CKV2 sequence; 1 page.
Fickers, Patrick et al.; "The lipases from *Yarrowia lipolytica*: Genetics, production, regulation, biochemical characterization and biotechnological applications"; Biotechnical Advances 29 (2011) 632-644; Apr. 28, 2011.
Kumari, Arti et al.; "Extracellular expression and characterization of thermostable lipases, LIP8, LIP14 and LIP18, from *Yarrowia lipolytica*"; Biotechnol Lett (2012) 34:1733-1739; May 25, 2012.

* cited by examiner

*Primary Examiner* — Tekchand Saidha
(74) *Attorney, Agent, or Firm* — Yoshimi D. Barron

(57) ABSTRACT

The present invention relates to a wild-type, non-engineered, microbial lipolytic enzyme with a higher specificity for short-chain fatty acids than for medium to long fatty acids, specially long fatty acids. This invention further relates to a process for preparing a food product, and to the use of the wild-type, non-engineered, microbial lipolytic enzyme.

10 Claims, No Drawings
Specification includes a Sequence Listing.

LIPASES, COMPOSITIONS, METHODS AND USES THEREOF

CROSS-REFERENCE TO RELATED APPLICATIONS

The present application is the U.S. National Stage of International Application No. PCT/EP2021/054825, filed Feb. 26, 2021, and claims priority to European Patent Application No. 20160150.7, filed Feb. 28, 2020, and European Patent Application No. 20193597.0, filed Aug. 31, 2020.

TECHNICAL FIELD

The present invention relates to a wild-type, non-engineered, microbial lipolytic enzyme with a high specificity for short-chain fatty acids, preferably with a higher specificity for short chain fatty acids than for medium to long chain fatty acids, preferably when compared to a known microbial lipolytic enzyme, a nucleic acid encoding said lipolytic enzyme, a vector, a host cell and/or a composition comprising the lipolytic enzyme. This invention also relates to a process for preparing a food product, such as a dairy product, wherein the lipolytic enzyme is used.

This invention is suitable for use in the food industry, preferably in the dairy industry, more preferably in the cheese industry leading, for example, to flavor enhancement or shortening of the ripening times for ripened cheeses.

BACKGROUND

Lipolytic enzyme also called lipases (EC 3.1.1.3) are a class of hydrolases that hydrolyze ester bonds of lipids of triglycerides generating free fatty acids. This class of enzymes is responsible, for example, for the lipolysis of milk fat and/or other fat and subsequent release of short ($C_4$- to $C_6$-fatty acids), medium and/or long ($C_8$- and higher) chain fatty acids.

Each lipolytic enzyme has its own release profile of free fatty acids from milk fat and/or other fat. This profile may range from short ($C_4$- to $C_6$-fatty acids), to medium and/or long ($C_8$- and higher) chain fatty acids. The mixture of short ($C_4$- to $C_6$-fatty acids), medium and/or long ($C_8$- and higher) chain fatty acids obtained is dependent, at least, on the lipolytic enzyme and on the lipolytic substrate. The mixture of short ($C_4$- to $C_6$-fatty acids), medium and/or long ($C_8$- and higher) chain fatty acids obtained is responsible for modulating the flavor of a given final product. For example, a mixture having a higher amount or concentration of short chain fatty acids, such as a higher amount or concentration of butyric acid ($C_4$-fatty acid), than an amount or concentration of medium and/or long chain fatty acids leads to the development of a preferred rancid cheese flavor, in particular during ripening, and has been used for flavor generation in dairy products, for example in various cheese types. In contrast, a mixture having a higher amount or concentration of medium and/or long chain fatty acids, specially a mixture having a higher amount or concentration of long chain fatty acids ($C_{16}$- and higher), than an amount or concentration of short chain fatty acids gives rise to off flavors.

Lipolytic enzymes or lipases can be of animal origin or non-animal origin. Lipases from animal origin (kid goat, calf or lamb) preferably cleave short chain fatty acids ($C_4$- to $C_6$-fatty acids) from milk fat and/or other fat rather than long chain fatty acids. These short chain fatty acids, in particular $C_4$-fatty acids, are responsible for the formation of the preferred rancid taste rather than the soapy taste produced by the medium to long chain fatty acids. To lesser extent they also release medium chain fatty acids, which add animal specific taste to the cheese. Nevertheless, lipases from animal origin cannot be used in vegetarian and/or kosher products, which is a highly demanded market. On the other hand, lipases from non-animal origin, such as from microbial origin, fully fulfill the vegetarian and/or kosher requirements, however microbial lipases are known for being non-specific lipases mainly releasing medium to long chain fatty acids ($C_8$- and higher) from milk fat and/or other fat, thereby giving cheese an extremely unpleasant soapy taste.

Therefore, there is a driver in the food industry, especially in the cheese industry, to look for a new source of a microbial wild-type, non-engineered, lipase presenting a higher specificity towards short chain fatty acids, such as $C_4$-fatty acids and/or $C_6$-fatty acids, than towards medium or long chain fatty acids, and/or to look for a new source of a microbial wild-type, non-engineered, lipase presenting a higher specificity towards short chain fatty acids, such as $C_4$-fatty acids and/or $C_6$-fatty acids, and additionally a specificity towards medium chain fatty acids, such as $C_8$- or $C_{10}$-fatty acids, than towards long chain fatty acids.

Several attempts to replace animal lipases are known in the prior art. These attempts include the use of microbial lipases, recombinant lipases and/or genetic engineered lipases. However, these attempts have failed to deliver a microbial wild-type lipase with a higher specificity towards short chain fatty acids, preferably towards $C_4$-fatty acids, and a desirable flavor development in food products such as in cheese.

Microbial lipases can be obtained, for example, from *Aspergillus, Rhizopus*, and *Mucor*. The effect of these fungal lipases for developing rancidity in fats with respect to *Aspergillus* is disclosed by Iwai et al. in J. Gen. Appl. Microbiol. 10, 13-22 (1964), U.S. Pat. Nos. 4,726,954 or 4,636,468; with respect to *Rhizopus* is described by Oi et al. in Agr. Biol. Chem. 33, 729-38 (1969); and with respect to *Mucor* is set forth by Somkuti et al. in Appl. Microbiol. 16, 617-19 (1968). All the mentioned lipases have a higher specificity towards medium to long chain fatty acids, such as *Aspergillus* or *Rhizopus*, or towards medium chain fatty acids, as it is the case of *Mucor*, than towards short chain fatty acids, such as $C_4$- to $C_6$-fatty acids.

Microbial lipases can also be obtained from *Yarrowia*, such as *Yarrowia (Y.) lipolytica*. Several documents disclose the preference of lipases from *Yarrowia* towards medium to long chain fatty acids. For example, Kamoun et al. 2015 describes a higher specificity for trioctanoin than for tributyrin at pH 7.5 for Lip8; Aloulou et al. 2007 discloses a higher specificity for trioctanoin than for tributyrin at pH 6 for Lip2; Sheng, J., et al. 2012 mentions the LipY has the highest activity on $C_8$-$C_{12}$ fatty acids.

US2005059130 (or EP 2 290 059) also describes microbial lipases derived from *Humicola lanuginosa, Fusarium oxysporum* or *Rhizomucor miehei* (examples 10, 11 or 12, respectively), wherein the substrate specificity of the wild type enzymes was modified by making alterations to the amino acid sequences of said lipases and as such obtain variants with increased specificity for short-chain fatty acids. EP 3 081 644 discloses a modified lipase from *Candida cylindracea* also having higher specificity towards short-chain fatty acids. However, none of these microbial engineered lipases is a naturally occurring lipase with a higher specificity for short chain fatty acids than for medium to long chain fatty acids.

The foregoing illustrates the difficulty in obtaining a microbial wild-type lipase with higher specificity towards short chain fatty acids, specially towards $C_4$-fatty acids, and a lower specificity towards medium and/or long chain fatty acids, specially a lower specificity towards long chain fatty acids, leading to a reduction in soapiness and an increase in butyric flavors in a food product, such as a dairy product or cheese, and therefore able to replace the microbial lipases currently available.

SUMMARY OF THE INVENTION

The present invention provides a novel wild-type, microbial lipolytic enzyme suitable to be used in the food industry, preferably in the dairy industry, more preferably in the cheese industry. Surprisingly the enzymes herein disclosed have a higher specificity towards short chain fatty acids, in particular $C_4$-fatty acids and/or $C_6$-fatty acids, when compared to a known microbial lipolytic enzyme under the same conditions, in particular for the same dosage of enzyme and in the same fat matrix, meaning that these enzyme release or produce or generate more short chain fatty acids than known microbial enzyme(s). This is completely unexpected as, until now, wild-type microbial lipolytic enzymes were known to be specific towards medium or long chain fatty acids and not short chain fatty acids, preferably not specific towards $C_4$-fatty acids and/or $C_6$-fatty acids.

This invention relates to a lipase comprising an amino acid sequence

- having at least 90% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, or
- having at least 95%, 96%, 97%, 98% or 99% identity SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1 or wherein the sequence is SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1.

This invention also relates to a lipase comprising an amino acid sequence

- having at least 90% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, or
- having at least 95%, 96%, 97%, 98% or 99% identity SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, or
- wherein the sequence is SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, and
- wherein the lipase has a higher specificity towards the release of $C_4$-fatty acids from a dairy composition comprising milk fat and/or other fat if compared with the release of $C_{10}$-fatty acids, preferably at a pH below 7, preferably at a pH of 6.6 to 6.8, or at a pH below 6, preferably at a pH between 3.8-5.6, more preferably at a pH between 4.4-5.4, even more preferably at a pH between 4.6-5.2, and/or
- preferably at a temperature below 40° C., or below 30° C., or below 20° C., preferably below 15° C., more preferably below 10° C., even more preferably between 5-8° C.

This invention also relates to a lipase comprising an amino acid sequence

- having at least 90% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, or
- having at least 95%, 96%, 97%, 98% or 99% identity SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1 or
- wherein the sequence is SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, and
- wherein said lipase has a higher specificity towards the release of $C_4$-fatty acids from a dairy composition comprising milk fat and/or other fat if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acids-$C_{16:0}$-fatty acids, preferably at a pH between 3.8-5.6, more preferably at a pH between 4.4-5.4, even more preferably at a pH between 4.6-5.2 and/or preferably at a temperature below 20° C., preferably below 15° C., more preferably below 10° C., even more preferably between 5-8° C.

In a preferred embodiment, the lipase herein disclosed—SEQ ID NO: 1 or 2 or 3 or 4 or 5 or 6 or 7 or 8 or 9 or 10 or 11—is an isolated microbial lipase, a recombinant microbial lipase or a synthetic microbial lipase.

Although the present invention relates to a wild-type, non-engineered, microbial lipolytic enzyme the skilled person is aware that one or more alterations may be made to any of the amino acid sequence of the enzymes herein disclosed without interfering with the activity of the said enzyme and preferably without changing the $C_{4:0}$ fatty acid preference of the sequence. Such alteration can be an addition, a substitution or a deletion. For example, a change in the N-terminal or C-terminal of any one of the sequences herein disclose may lead to a different sequence without, however, changing the fatty acid preference of the changed sequence versus the unchanged one. These alterations are herein contemplated as well.

This invention also relates to an isolated DNA sequence or recombinant DNA sequence or synthetic DNA sequence, wherein the isolated DNA sequence or recombinant DNA sequence or synthetic DNA is selected from a sequence having at least 90%, or at least 95%, or at least 96%, or at least 97%, or at least 98% or at least 99%, or 100% sequence identity with SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23.

In a preferred embodiment, said DNA sequence may further comprise a signal peptide sequence.

This invention further concerns a vector, such as a cloning vector and/or an expression vector, comprising an isolated DNA sequence or recombinant DNA sequence or synthetic DNA sequence encoding the lipase SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 herein disclosed, or encoding a lipase having at least 90% sequence identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, or having at least 95%, 96%, 97%, 98% or 99% sequence identity with SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11. The DNA sequence may be SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23, or a sequence having at least 90%, or at least 95%, or at least 96%, or at least 97%, or at least 98% or at least 99% sequence identity with SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23. The sequence is cloned into the vector using standard cloning techniques. The selection of the cloning vector and/or expression vector is dependent on the host cell, as the cloning vector and/or expression vector need to be compatible with the host cell.

The invention also relates to a host cell, preferably a recombinant host cell, comprising SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10, or SEQ ID NO: 11 or SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23, or comprising a sequence having at least 90% sequence identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, or having at least 95%, 96%, 97%, 98% or 99% sequence identity with SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, or comprising a sequence having at least 90%, or at least 95%, or at least 96%, or at least 97%, or at least 98% or at least 99% sequence identity with SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23.

The invention also concerns a method of growing, transforming or transfecting said vector in a suitable host cell and in a condition leading to expression of the polypeptide or to the over-expression of the polypeptide.

A suitable host cell used in this invention may be any host cell in which a recombinant DNA can be replicated and a gene encoding an enzyme can be expressed. Preferably, the host cell may be a mammalian cell, an insect cell, a microbial cell, e.g. a bacterial cell or a fungal cell wherein a yeast cell is included.

Examples of suitable yeasts may be *Saccharomyces* spp., *Schizosaccharomyces* spp., *Candida* spp., *Pichia* spp., *Kluyveromyces* spp., such as *Saccharomyces cerevisiae; Candida cylindracea*, or *Pichia pastoris*.

Examples of suitable fungal cells, including filamentous fungal cells, may be selected from *Fusarium* spp., *Aspergillus* spp., *Trichoderma* spp., such as *Fusarium oxysporium, Aspergillus oryzae* or *Aspergillus niger.*

Examples of suitable bacteria are Gram-negative such as *Escherichia coli* or Gram-positive bacteria selected from *Bacillus* spp., *Streptomyces* spp., *Corynebacterium* spp., such as *Bacillus subtilis, Bacillus licheniformis, Bacillus lentus, Bacillus brevis, Bacillus stearothermophilus, Bacillus alkalophilus, Bacillus amyloliquefaciens, Bacillus coagulans, Bacillus circulans, Bacillus lautus, Bacillus megaterium, Bacillus thuringiensis; Streptomyces lividans* or *Streptomyces murinus*. The transformation of bacteria may, for instance, be effected by using competent cells in a manner known in the art or by any other way known in the art.

In a preferred embodiment, the host cell is selected from *Pichia pastoris, Saccharomyces* spp., *Saccharomyces cerevisiae, Schizosaccharomyces* spp., *Candida* spp., *Candida cylindracea, Kluyveromyces* spp., *Fusarium* spp., *Fusarium oxysporium, Aspergillus* spp., *Aspergillus oryzae* or *Aspergillus niger, Trichoderma* spp., *Escherichia coli* or *Bacillus* spp., *Bacillus subtilis, Bacillus licheniformis, Bacillus lentus, Bacillus brevis, Bacillus stearothermophilus, Bacillus alkalophilus, Bacillus amyloliquefaciens, Bacillus coagulans, Bacillus circulans, Bacillus lautus, Bacillus megaterium, Bacillus thuringiensis, Streptomyces* spp., *Streptomyces lividans* or *Streptomyces murinus, Corynebacterium* spp., preferably *Pichia pastoris, Aspergillus oryzae* or *Aspergillus niger*, or *Bacillus subtilis*, more preferably *Pichia pastoris* or *Bacillus subtilis*.

The invention also relates to a lipase consisting of an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11; wherein the lipase is expressed in *Pichia pastoris* and has a higher specificity towards the release of $C_4$-fatty acids from a dairy composition comprising milk fat and/or other fat if compared with the release of $C_{10}$-fatty acids, or if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acids-$C_{16:0}$-fatty acids or if compared with the release of $C_{16}$-$C_{18}$-fatty acids.

The present invention also concerns a method for preparing a food product comprising a step of using or adding a lipase comprising an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 11, preferably, wherein the food product has a higher content or amount or concentration of short chain fatty acids, such as $C_4$- and/or $C_6$-fatty acids, than if compared with the content or amount or concentration of medium to long chain fatty acids; or comprising a step of using or adding a lipase encoded by a DNA sequence selected from a sequence having at least 90%, or at least 95%, or at least 96%, or at least 97%, or at least 98% or at least 99%, or 100% sequence identity with SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23, preferably having at least 90%, or at least 95%, or at least 96%, or at least 97%, or at least 98% or at least 99%, or 100% sequence identity with SEQ ID NO: 12 or SEQ ID NO: 13 or SEQ ID NO: 14 or SEQ ID NO: 20 or SEQ ID NO: 22 or SEQ ID NO: 23, preferably wherein the food product has a higher content or amount or concentration of short chain fatty acids, such as $C_4$- and/or $C_6$-fatty acids, than if compared with the content or amount or concentration of medium to long chain fatty acids.

In a preferred embodiment, the food product may be a dairy product, as a cheese product, a processed cheese, a cheese-like product, or an enzyme-modified cheese, or a butter, a yogurt, a cream, a seasoning.

In a preferred embodiment, the dairy product is a cheese product, preferably wherein the cheese product is Pecorino, Provolone, Parmesan, Grana Padano, Parmigiano Reggiano, Romano, Chester, Danbo, Manchego, Saint Paulin, Cheddar, Monterey, Colby, Edam, Gouda, Muenster, Swiss type, Gruyere, Emmental; curd-cheeses such as Feta cheese; pasta filata cheeses such as Mozzarella, and Queso fresco cheese; fresh cheese such as Ricotta, Cream cheese, Neufchatel or Cottage cheese; cream cheese, white mold cheese such as Brie and Camembert cheese, blue mold cheese such as Gorgonzola and Danish blue cheese; and processed cheese, preferably Feta cheese or Provolone cheese.

In another embodiment, the food product may be a non-dairy product, preferably a non-dairy cheese or vegan cheese, more preferably wherein the lipase has a higher specificity towards the release of $C_4$-fatty acids from a composition comprising fat such as vegetable fat or from a water-in-oil emulsion if compared with the release of $C_{10}$-fatty acids or if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acids-$C_{16:0}$-fatty acids or if compared with the release of $C_{16}$-$C_{18}$-fatty acids.

In a preferred embodiment, cheese flavor or cheese intensity can be increased and/or improved by applying a lipase of the present invention. The increase or improvement of cheese flavor or cheese intensity can apply to cheese itself or to processed cheese, to cheese-like product or to enzyme-modified cheese or even to non-dairy cheese such as vegan cheese.

In a preferred embodiment, the lipases herein disclosed may be added, for example, to an intermediate product during the process of producing a food product or to a raw material such as milk, in particular milk obtained from a cow, sheep, goat, among others.

The invention also concerns the use of a lipase comprising an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11, for producing a food product or as an agent for producing a food product, preferably wherein the food product has a higher content or amount or concentration of short chain fatty acids, such as $C_4$- and/or $C_6$-fatty acids, than if compared with the content or amount or concentration of medium to long chain fatty acids, and wherein the food product is as a dairy product or a cheese product, a processed cheese, a cheese-like product, or an enzyme-modified cheese, or a butter, a yogurt, a cream, a seasoning.

In a preferred embodiment, the use of a lipase is for producing a food product, in particular a dairy product or a cheese such Pecorino, Provolone, Parmesan, Grana Padano, Parmigiano Reggiano, Romano, Chester, Danbo, Manchego, Saint Paulin, Cheddar, Monterey, Colby, Edam, Gouda, Muenster, Swiss type, Gruyere, Emmental; curd-cheeses such as Feta cheese; pasta filata cheeses such as Mozzarella, and Queso fresco cheese; fresh cheese such as Ricotta, Cream cheese, Neufchatel or Cottage cheese; cream cheese, white mold cheese such as Brie and Camembert cheese, blue mold cheese such as Gorgonzola and Danish blue cheese, preferably Feta cheese or Provolone cheese; or processed cheese.

The invention also relates to the use of a lipase for producing or releasing more $C_4$-fatty acids from a dairy composition comprising milk fat and/or other fat, than for producing or releasing more $C_6$-fatty acids, $C_8$-fatty acids, $C_{10}$-fatty acids, $C_{12}$-fatty acids, $C_{14}$-fatty acids, $C_{16}$-fatty acids, $C_{18:0}$-fatty acids, $C_{18:1}$-fatty acids, or $C_{18:2}$-fatty acids, or $C_{18:3}$-fatty acids, wherein the lipase comprises an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11.

The invention also concerns the use of a lipase for producing or releasing more $C_4$-fatty acids and/or $C_6$-fatty acids in a food product than for producing or releasing, $C_8$-fatty acids, $C_{10}$-fatty acids, $C_{12}$-fatty acids, $C_{14}$-fatty acids, $C_{16}$-fatty acids, $C_{18:0}$-fatty acids, $C_{18:1}$-fatty acids, or $C_{18:2}$-fatty acids, or $C_{18:3}$-fatty acids in the food product, wherein the lipase comprises an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11,
    preferably wherein the food product is a dairy product selected from a cheese, or a processed cheese, or enzyme-modified cheese, or a cheese-like product, or a butter, or a yogurt, or a cream, or a seasoning, or
    preferably wherein the food product is a non-dairy product such as a non-dairy cheese or vegan cheese.

In an embodiment, the food product is a dairy product selected from a cheese and wherein the cheese is Feta cheese, or Provolone cheese, or Pecorino cheese, or Parmesan cheese, or Grana Padano cheese, or Parmigiano Reggiano cheese, or Romano cheese, or Chester cheese, or Danbo cheese, or Manchego cheese, or Saint Paulin cheese, or Cheddar cheese, or Monterey cheese, or Colby cheese, or Edam cheese, or Gouda cheese, or Muenster cheese, or Swiss type cheese, or Gruyere cheese, or Emmental cheese; or pasta filata cheeses such as Mozzarella, and Queso fresco cheese; or fresh cheese such as Ricotta, Cream cheese, Neufchatel or Cottage cheese; or cream cheese, or white mold cheese such as Brie and Camembert cheese, or blue mold cheese such as Gorgonzola and Danish blue cheese, preferably Feta cheese or Provolone cheese.

Furthermore, the invention concerns a food product obtainable by using a lipase SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably wherein the food product is a dairy product such as a cheese product, a processed cheese, a cheese-like product, or a butter, a yogurt, a cream, a seasoning, more preferably wherein the dairy product is a cheese, such Pecorino, Provolone, Parmesan, Grana Padano, Parmigiano Reggiano, Romano, Chester, Danbo, Manchego, Saint Paulin, Cheddar, Monterey, Colby, Edam, Gouda, Muenster, Swiss type, Gruyere, Emmental; curd-cheeses such as Feta cheese; pasta filata cheeses such as Mozzarella, and Queso fresco cheese; fresh cheese such as Ricotta, Cream cheese, Neufchatel or Cottage cheese; cream cheese, white mold cheese such as Brie and Camembert cheese, blue mold cheese such as Gorgonzola and Danish blue cheese; and processed cheese, preferably Feta cheese or Provolone cheese.

The invention is related as well with a food product comprising a lipase, wherein the lipase comprises an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11, and
    wherein the food product comprises more $C_4$-fatty acids than $C_{10}$-fatty acids or than any other fatty acid selected from $C_6$-fatty acids or $C_8$-fatty acids or $C_{12}$-fatty acids or $C_{14}$-fatty acids or $C_{16}$-fatty acids or $C_{18:1}$-fatty acids or $C_{18:2}$-fatty acids or $C_{18:3}$-fatty acids and/or
    wherein the food product comprises more $C_6$-fatty acids than $C_{10}$-fatty acids or than any other fatty acid selected from $C_8$-fatty acids or $C_{12}$-fatty acids or $C_{14}$-fatty acids or $C_{16}$-fatty acids or $C_{18:1}$-fatty acids or $C_{18:2}$-fatty acids or $C_{18:3}$-fatty acids.

In an embodiment, the food product is a dairy product selected from a cheese, a processed cheese, a cheese-like product, an enzyme-modified cheese, or a butter, a yogurt, a cream, a seasoning, preferably wherein the cheese is Feta cheese, or Provolone cheese, or Pecorino cheese, or Parmesan cheese, or Grana Padano cheese, or Parmigiano Reggiano cheese, or Romano cheese, or Chester cheese, or Danbo cheese, or Manchego cheese, or Saint Paulin cheese, or Cheddar cheese, or Monterey cheese, or Colby cheese, or Edam cheese, or Gouda cheese, or Muenster cheese, or Swiss type cheese, or Gruyere cheese, or Emmental cheese; or pasta filata cheeses such as Mozzarella, and Queso fresco cheese; or fresh cheese such as Ricotta, Cream cheese, Neufchatel or Cottage cheese; or cream cheese, or white mold cheese such as Brie and Camembert cheese, or blue mold cheese such as Gorgonzola and Danish blue cheese, more preferably Feta cheese or Provolone cheese.

In another embodiment, the food product is a non-dairy product such as a non-dairy cheese or vegan cheese.

The invention also relates to a composition comprising a lipase according to SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, and/or a DNA sequence according SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23, and/or a vector comprising any of the sequences SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 or SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23 and/or a host cell comprising any of the sequences SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 or SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23, preferably wherein the composition is for preparing a food product, such as a dairy product or cheese.

Definitions

In the context of the present invention the terms "short chain fatty acid", "medium chain fatty acid", "long chain fatty acid", "FFA", "lipase", "lipolytic enzyme", "microbial lipase", "microbial lipolytic enzyme", "lipase with higher specificity towards the release of short-chain fatty acids", "lipase with higher specificity towards the release of $C_4$-fatty acids", "lipase with higher specificity towards the release of $C_6$-fatty acids", lipase with higher specificity towards the release of medium and/or long-chain fatty acids", "lipase activity", "lipase dosage", "wild type", "synthetic sequence", "isolated sequence", "recombinant sequence", "mature protein sequence", "expression vector", "sequence identity", "food product", "dairy product", "cheese", "cheese product", "processed cheese", "enzyme-modified cheese", "cheese-like product", "improvement factor (IF)", "control microbial lipase", "signal peptide", "pro-peptide" have the meaning explained below.

The term "short chain fatty acid" means a fatty acid comprising 4-6 carbons. Examples of short chain fatty acids are: butyric acid (butanoic acid; $C_4$), valeric acid (pentanoic acid; $C_5$) or caproic acid (hexanoic acid; $C_6$).

The term "medium chain fatty acid" means a fatty acid comprising 8-12 carbons. Examples of medium chain fatty acids are: caprylic acid (octanoic acid; $C_8$), pelargonic acid (nonanoic acid; $C_9$), capric acid (decanoic acid; $C_{10}$), undecylic acid (undecanoic acid; $C_{11}$) or lauric acid (dodecanoic acid; $C_{12}$).

The term "long chain fatty acid" means a fatty acid comprising 14-18 or more carbons. Examples of long chain fatty acids are: myristic acid (tetradecanoic acid; $C_{14}$), pentadecanoic acid ($C_{18}$), palmitic acid (hexadecanoic acid; $C_{16}$), margaric acid (heptadecanoic acid; $C_{17}$), stearic acid (octadecanoic acid; $C_{18}$).

The term "FFA" stands for free fatty acid.

The term "lipase" and "lipolytic enzyme" are used interchangeably.

The term "microbial lipase" and "microbial lipolytic enzyme" are used interchangeably, and as used herein means a lipase or a lipolytic enzyme expressed by a naturally occurring microorganism found in nature. Furthermore, the microorganism may be a filamentous fungus and/or a non-filamentous fungus. Thus, the lipase or the microbial lipase or the microbial lipolytic enzyme may be a filamentous fungus lipase and/or non-filamentous fungus lipase. The term "lipase with higher specificity towards the release of short-chain fatty acids", from a dairy composition comprising milk fat and/or other fat, means that said lipase preferably hydrolyzes ester bonds of lipids of triglycerides generating more $C_4$-fatty acids and/or more $C_6$-fatty acids rather than generating medium and/or long chain fatty acids.

The term "lipase with higher specificity towards the release of $C_4$-fatty acids", from a dairy composition comprising milk fat and/or other fat, means that said lipase preferably hydrolyzes ester bonds of lipids of triglycerides generating more $C_4$-fatty acids rather than generating other kinds of fatty acids, such as medium and/or long chain fatty acids. Preferably, the term "lipase with higher specificity towards the release of $C_4$-fatty acids", from a dairy composition comprising milk fat and/or other fat, if compared with the release of $C_{10}$-fatty acids means that said lipase preferably hydrolyses ester bonds of lipids of triglycerides generating more $C_4$-fatty acids rather than generating $C_{10}$-fatty acids. More preferably, the term "lipase with higher specificity towards the release of $C_4$-fatty acids", from a dairy composition comprising milk fat and/or other fat, if compared with the release of $C_8$-fatty acids or $C_6$-fatty acids or $C_{12}$-fatty acids or $C_{18:2}$-fatty acids or $C_{14}$-fatty acids or $C_{18:0}$-fatty acids or $C_{18:1}$-fatty acids or $C_{16}$-fatty acids means that said lipase preferably hydrolyses ester bonds of lipids of triglycerides generating more $C_4$-fatty acids rather than generating $C_8$-fatty acids or $C_6$-fatty acids or $C_{12}$-fatty acids or $C_{18:2}$-fatty acids or $C_{14}$-fatty acids or $C_{18:0}$-fatty acids or $C_{18:1}$-fatty acids or $C_{16}$-fatty acids, respectively. In particular, the molar fraction of $C_4$-fatty acids is higher than the molar fraction of medium and/or long chain fatty acids, for the same tested conditions, preferably the molar fraction of $C_4$-fatty acids is higher than the molar fraction of other fatty acids, such as $C_6$-fatty acids or $C_8$-fatty acids or $C_{10}$-fatty acids or $C_{12}$-fatty acids or $C_{14}$-fatty acids or $C_{16}$-fatty acids or $C_{18:0}$-fatty acids or $C_{18:1}$-fatty acids or $C_{18:2}$-fatty acids.

The term "lipase with higher specificity towards the release of $C_4$-fatty acids", from a dairy composition comprising milk fat and/or other fat, also means that said lipase preferably hydrolyzes ester bonds of lipids of triglycerides generating more $C_4$-fatty acids than a control microbial lipase. In particular, the molar fraction of $C_4$-fatty acids of the tested lipase is higher than the molar fraction of $C_4$-fatty acids of the control microbial lipase.

The term "lipase with higher specificity towards the release of $C_6$-fatty acids", from a dairy composition comprising milk fat and/or other fat, means that said lipase preferably hydrolyzes ester bonds of lipids of triglycerides generating more $C_6$-fatty acids rather than generating other kinds of fatty acids, such as medium and/or long chain fatty acids. Preferably, the term "lipase with higher specificity towards the release of $C_6$-fatty acids", from a dairy composition comprising milk fat and/or other fat, if compared with the release of $C_{10}$-fatty acids means that said lipase preferably hydrolyses ester bonds of lipids of triglycerides generating more $C_6$-fatty acids rather than generating $C_{10}$-fatty acids. More preferably, the term "lipase with higher specificity towards the release of $C_6$-fatty acids", from a dairy composition comprising milk fat and/or other fat, if compared with the release of $C_8$-fatty acids or $C_{12}$-fatty acids or $C_{18:2}$-fatty acids or $C_{14}$-fatty acids or $C_{18:0}$-fatty acids or $C_{18:1}$-fatty acids or $C_{16}$-fatty acids means that said lipase preferably hydrolyses ester bonds of lipids of triglycerides generating more $C_6$-fatty acids rather than generating $C_8$-fatty acids or $C_{12}$-fatty acids or $C_{18:2}$-fatty acids or $C_{14}$-fatty acids or $C_{18:0}$-fatty acids or $C_{18:1}$-fatty acids or $C_{16}$-fatty acids, respectively. In particular, the molar fraction of $C_6$-fatty acids is higher than the molar fraction of medium and/or long chain fatty acids, for the same tested conditions, preferably the molar fraction of $C_6$-fatty acids is higher than the molar fraction of other fatty acids, such as $C_8$-fatty acids or $C_{10}$-fatty acids or $C_{12}$-fatty acids or $C_{14}$-fatty acids or $C_{16}$-fatty acids or $C_{18:0}$-fatty acids or $C_{18:1}$-fatty acids or $C_{18:2}$-fatty acids.

The term "lipase with higher specificity towards the release of $C_6$-fatty acids", from a dairy composition comprising milk fat and/or other fat, also means that said lipase preferably hydrolyzes ester bonds of lipids of triglycerides generating more $C_6$-fatty acids than a control microbial lipase. In particular, the molar fraction of $C_6$-fatty acids of the tested lipase is higher than the molar fraction of $C_4$-fatty acids of the control microbial lipase.

The term "lipase with higher specificity towards the release of medium and/or long-chain fatty acids", from a dairy composition comprising milk fat and/or other fat, means that said lipase preferably hydrolyzes ester bonds of lipids of triglycerides generating $C_8$- to $C_{18}$-fatty acids rather than generating $C_4$-fatty acids and/or $C_6$-fatty acids. In particular, the molar fraction of $C_8$- to $C_{18}$-fatty acids of the tested lipase is higher than the molar fraction of $C_8$- to $C_{18}$-fatty of the control microbial lipase.

In the context of the present inventions the following terms are interchangeable "$C_4$-fatty acids" and "$C_{4:0}$-fatty acids"; "$C_6$-fatty acids" and "$C_{6:0}$-fatty acids"; "$C_8$-fatty acids" and "$C_{8:0}$-fatty acids"; "$C_{10}$-fatty acids" and "$C_{10:0}$-fatty acids"; "$C_{12}$-fatty acids" and "$C_{12:0}$-fatty acids"; "$C_{14}$-fatty acids" and "$C_{14:0}$-fatty acids". The term "$C_{16}$-fatty acids" may include $C_{16:0}$-fatty acids and $C_{16:1}$-fatty acids". The term "$C_{18}$-fatty acids" may include $C_{18:0}$-fatty, $C_{18:1}$-fatty acids and $C_{18:3}$-fatty.

The term "lipase activity" and "lipase dosage" are used interchangeably. The "lipase activity" may be determined, for dosing in cheese and cream, for example by the International Dairy Federation (IDF) method for both the commercial lipase and the enzymes herein disclosed (SEQ ID NO 1-11). The IDF method, mainly, corresponds to the International Standard ISO 13082:2011, 1st edition of 2011-11-15, IDF 218:2011 (also labelled as ISO 130821218). However, in the present invention, the term "LFU/L of milk" is used. The term "LFU/L of milk" relates to the concentration or amount of enzyme or dosage of enzyme per liter of milk used to produce a dairy product, such as cheese. In the context of the present invention "LFU/L of milk" means lipase forestomach units per liter of milk. One LFU is defined as the amount of lipase activity that releases butyric acid at a rate of 1.25 µmol/min, under the tested conditions. Further, the lipase activity may also be determined as explained in the Examples below. Finally, there are other methods of determining lipase activity which has been disclosed in prior art documents (such as in EP 3 081 644, EP 2 254 996 or EP 1 776 455). However, what is relevant is that within the same example or within comparative examples, the lipase activity is determined in the same way for all lipases under analysis, including the control lipase.

The term "wild type" lipase means, in the context of the present invention, a lipase whose sequence has not been mutated, i.e. does not contain amino acid deletions, additions or substitutions, when compared with a mature protein sequence (after co- and/or post-translational cleavage events) endogenously produced. Wild type lipases of the present invention may be encoded by codon optimized polynucleotides for heterologous expression and may also comprise a non-endogenous signal- and/or propeptide selected for expression in a given host. Furthermore, in the present invention, a lipase may also be synthetically obtained or genetically modified, using methods well known in the art, as to reproduce the wild-type lipase.

The term "synthetic sequence" or a variation thereof means a sequence that has been prepared by in vitro chemical or enzymatic synthesis. It includes, but is not limited to, sequences made with optimal codon usage for host organisms. The term applies to a synthetic microbial lipase or to a synthetic DNA sequence.

The term "isolated sequence" or a variation thereof means a sequence which is at least substantially free from at least one other component with which the sequence is naturally associated in nature and as found in nature. In alternative, an "isolated sequence" can also mean a sequence removed from its native environment. For example, sequences which have been recombinantly produced in a host organism are considered isolated for the purpose of this invention as are native or recombinant sequences which have been substantially purified by any suitable technique as such, for example, a purification method. Purification methods are well known in the art. The term applies to an isolated microbial lipase or to an isolated DNA sequence.

The term "recombinant sequence" or a variation thereof means a sequence that has been prepared using recombinant DNA techniques, which are within the capabilities of a person skilled in the art and are explained in literature, for example, J. Sambrook, E. F. Fritsch, and T. Maniatis, 1989, Molecular Cloning: A Laboratory manual, $2^{nd}$ edition, books 1-3, Cold Spring Harbor Laboratory Press. The term applies to a recombinant microbial lipase or to a recombinant DNA sequence.

The term "mature protein sequence" used herein means a sequence having lipolytic activity that is in its final form following translation and any co- and/or post-translational cleavage events or modifications, such as N-terminal processing, C-terminal truncation, glycosylation, phosphorylation, among other events or modifications.

The term "expression vector" means a construct capable of in vivo or in vitro expression. The expression vector may be incorporated, in particular stably incorporated, into the genome of a suitable host organism.

The term "sequence identity" describes a quantitative measure of similarity between two amino acid sequences or two nucleotide sequences. For purposes of the present invention, the degree of sequence identity between two amino acid sequences is based on aligning both sequences with the blastp suite provided by the National center for Biotechnology Information (NCBI) on https://blast.ncbi.nlm.nih.gov applying standard parameter settings (Matrix: BLOSUM62, Gap Costs: Existence: 11 Extension: 1, Conditional compositional score matrix adjustment) and subsequent quantification of identical amino acid pairs in identical positions over the aligned amino acid sequences.

The term "food product" refers to a kind of milk-based product intended to be used as food, including, but not limited to, cheese, milk, skimmed milk, acidified milk, butter milk, condensed milk, spread, margarine, yoghurt, ice cream, milk powder, butter, dulce de leche, among others.

The term "dairy product" is intended to include any food product made using milk or milk-based product, including, but not limited to, cheese, milk, skimmed milk, acidified milk, butter milk, condensed milk, spread, margarine, yoghurt, ice cream, milk powder, butter, dulce de leche, among others.

The term "cheese" or "cheese product" are used interchangeably. The term "cheese" is understood to encompass any cheese, including, but not limited to, hard cheeses such as Pecorino, Provolone, Parmesan, Grana Padano, Parmigiano Reggiano, Romano, Chester, Danbo, Manchego, Saint Paulin, Cheddar, Monterey, Colby, Edam, Gouda, Muenster, Swiss type, Gruyere, Emmental; curd-cheeses such as Feta cheese; pasta filata cheeses such as Mozzarella, and Queso fresco cheese; fresh cheese such as Ricotta, Cream cheese, Neufchatel or Cottage cheese; cream cheese, white mold cheese such as Brie and Camembert cheese, blue mold cheese such as Gorgonzola and Danish blue cheese; and processed cheese, enzyme-modified cheese (EMC) or cheese-like product.

The term "processed cheese" is preferably manufactured from cheese or cheese analogues by cooking and emulsifying the cheese, such as with emulsifying salts (e.g. phosphates and citrate). The process may further include the addition of spices/condiments.

The term "enzyme-modified cheese" or "EMC" is understood as cheese curd which has been treated with enzymes to produce a concentrated cheese flavor ingredient which may have approximately 15-30 times the flavor intensity of natural cheese. EMCs are available as pastes or dried to form powders and are used to give a cheese flavor note to products such as processed cheese or analogue cheese, cheese powders, soups, sauces, dips, crackers, salad dressings and in coatings for snack foods.

The term "cheese-like product" is understood as cheese-like products which contain fat, such as e.g. milk fat (e.g. cream or butter) or vegetable oil, as a part of the composition, and which further contain, as part of the composition, one or more non-milk constituents, such as e.g. a vegetable constituent (e.g. vegetable protein or vegetable oil). In the context of the present invention, a "cheese-like product" includes a non-dairy cheese, also known as vegan cheese, wherein the fat used to make the non-dairy cheese is vegetable oil or an emulsion such as water-in-oil emulsion, instead of milk fat.

The term "improvement factor (IF)" is defined as the ratio obtained when dividing the enzymatic specificity for the release of short chain fatty acids of a tested lipase by the enzymatic specificity for the release of short chain fatty acids of a control lipase, preferably a control microbial lipase or is defined as the ratio obtained when dividing the enzymatic specificity for the release of medium chain fatty acids of a tested lipase by the enzymatic specificity for the release of medium chain fatty acids of a control lipase, preferably a control microbial lipase. If the ratio is 1, then the tested lipase has an identical preference, or specificity, for short chain fatty acids as control sequence. If the ratio is lower than one, then the tested lipase has less preference, or specificity, for short chain fatty acids than the control lipase, preferably a control microbial lipase. If the ratio is higher than one, then the tested lipase has higher preference, or specificity, for short chain fatty acids than the control. The enzymatic specificity for short chain fatty acids is obtained by dividing the enzymatic activity for short chain fatty acids $C_4$ or $C_6$ by the enzymatic activity for long chain fatty acids $C_{16}$-$C_{18}$. The improvement factor (IF) may also be determined by the ratio obtained when dividing the enzymatic specificity for the release of long chain fatty acids of a tested lipase by the enzymatic specificity for the release of long chain fatty acids of a control lipase, preferably a control microbial lipase. If the ratio is 1, then the tested lipase has an identical preference, or specificity, for longer chain fatty acids as the control lipase, preferably a control microbial lipase. If the ratio is lower than one, then the tested lipase has less preference, or specificity, for long chain fatty acids than the control. If the ratio is higher than one, then the tested lipase has higher preference, or specificity, for long chain fatty acids than the control. The enzymatic specificity for long chain fatty acids is obtained by dividing the enzymatic activity for long chain fatty acids $C_{16}$-$C_{18}$ by the enzymatic activity for short chain fatty acids $C_4$ or $C_6$.

The term "control lipase" or "control microbial lipase" or "control lipolytic enzyme" or "control microbial lipolytic enzyme" is a commercial microbial lipase from Rhizomucur miehei (Palatase®, Palatase® 20000 L, available from Novozymes A/S), and herein labelled as commercial microbial lipase or commercial microbial lipase A. Alternatively, other microbial lipases from Rhizomucur miehei can be used, for example SpiceIT™ MR available from Chr. Hansen.

The term "signal peptide" relates to an amino acid sequence fused to the N-terminus of the polypeptide chain of the enzyme that is recognized by the secretory pathway of the enzyme producing microbial organism to translocate the synthesized protein into the cellular membrane or secrete it out of the cell into the fermentation medium.

The term "propeptide" relates to a polypeptide chain fused to the N-terminus of the major peptide chain of an enzyme that may support folding of the synthesized protein and/or contribute to its stability. The propeptide is cleaved during maturation or activation of the enzyme. A propeptide acts as an N-terminal extension of protein, distinct from the signal sequence which is necessary for the transport of the protein into or through the membrane, or for its secretion into the extracellular medium. The presence of a propeptide sequence may lead to a stabilization of the expression of lipases and/or may prevent inactivation in vivo of the lipase.

Amino acids are herein indicated by their one letter code or by their three letter code, both of which are well known to a person skilled in the art.

In the context of the present invention, SEQ ID NO:1-11 stands for SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 and SEQ ID NO: 11. Further, in the context of this invention, SEQ ID NO:12-23 stands for SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22 and SEQ ID NO: 23.

DETAILED DESCRIPTION

The present invention relates to a non-animal, wild-type derived from a microorganism lipase fulfilling the vegetarian and/or kosher requirements while simultaneously presenting a specificity and preference for the cleavage of short chain fatty acids, preferably presenting a higher specificity towards $C_4$-fatty acids and/or $C_6$-fatty acids rather other kinds of fatty acids or presenting a higher specificity towards $C_4$-fatty acids and/or $C_6$-fatty acids than a commercial microbial lipase.

The purpose of this invention is to provide a microbial wild-type lipase with a higher specificity towards the release of $C_4$-fatty acids and/or $C_6$-fatty acids, from a dairy composition comprising milk fat and/or other fat, if compared with the release of medium and/or long chain fatty acids, preferably if compared with the release of long-chain fatty acids, or a higher specificity towards the release of $C_4$-fatty acids and/or $C_6$-fatty acids, from a dairy composition comprising milk fat and/or other fat, if compared to the release of $C_4$-fatty acids and/or $C_6$-fatty acids of a commercial microbial lipase, without the need to generate any mutation (addition, deletion and/or substitution) in the lipase sequence. Thus, this invention relates to an improved (or alternative) microbial wild-type lipase with specificity towards short-chain fatty acids versus the prior microbial lipases. Therefore, the lipases herein disclosed may be obtained from microorganisms that produce the lipase naturally. In this case, said lipase is a wild-type lipase.

The microbial lipases wherein disclosed (SEQ ID NO:1-11) may be used to replace the microbial lipases currently available on the market.

EXAMPLES

Example 1—Cloning and Expression

A nucleotide sequence encoding for SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 was integrated into a targeted locus of an expression host such as *Pichia pastoris*. Codon-optimized genes encoding for SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 may or not be used. The nucleotide sequence encoding for SEQ ID NO: 1 is, for example, SEQ ID NO: 12 or SEQ ID NO: 23. The nucleotide sequence encoding for SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 can be, for example, SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20, or SEQ ID NO: 21 or SEQ ID NO: 22, respectively.

In an embodiment *Pichia pastoris* may be replaced by *Saccharomyces* spp., *Saccharomyces cerevisiae*, *Schizosaccharomyces* spp., *Candida* spp., *Candida cylindracea*, *Kluyveromyces* spp., *Fusarium* spp., *Fusarium oxysporium*, *Aspergillus* spp., *Aspergillus oryzae* or *Aspergillus niger*, *Trichoderma* spp., *Escherichia coli* or *Bacillus* spp., *Bacillus subtilis*, *Bacillus licheniformis*, *Bacillus lentus*, *Bacillus brevis*, *Bacillus stearothermophilus*, *Bacillus alkalophilus*, *Bacillus amyloliquefaciens*, *Bacillus coagulans*, *Bacillus circulans*, *Bacillus lautus*, *Bacillus megaterium*, *Bacillus thuringiensis*, *Streptomyces* spp., *Streptomyces lividans* or *Streptomyces murinus*, *Corynebacterium* spp., preferably *Aspergillus oryzae*, *Aspergillus niger*, or *Bacillus subtilis*.

A nucleotide sequence encoding for SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 may also be cloned into a conventional cloning and expression vector. Codon-optimized genes encoding for SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 may or not be used. The nucleotide sequence encoding for SEQ ID NO: 1 may be, for example, SEQ ID NO: 12 or SEQ ID NO: 23. The nucleotide sequence encoding for SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11 can be, for example, SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20, or SEQ ID NO: 21 or SEQ ID NO: 22, respectively.

The recombinant cloning and expression vector may be further introduced in a host cell, such as a recombinant host cell, using standard transformation or transfection protocols known to the person skilled in the art and explained in literature (for example, in J. Sambrook, E. F. Fritsch, and T. Maniatis, 1989, Molecular Cloning: A Laboratory manual, $2^{nd}$ edition, books 1-3, Cold Spring Harbor Laboratory Press).

The microbial lipases (SEQ ID NO:1-11) herein disclosed were independently expressed as follows. *Pichia pastoris* was used as a host for lipase expression. *Pichia pastoris* was grown on YPD agar plates (Invitrogen) under selective conditions (100 µg/mL Zeocin) at 30° C. for 16 h. Seed fermentation was performed by inoculating 3 mL YPD liquid medium (Invitrogen) including 100 µg/mL Zeocin with a single colony from the respective YPD agar plates, followed by incubation at 30° C. and 250 rpm agitation for 16 h. Main fermentation was performed in 4 mL total volume by diluting seed fermentations with BMGY medium (Invitrogen) including 100 µg/mL Zeocin to an $OD_{600}$ of 0.2, followed by incubation at 30° C. and 225 rpm agitation for 3 days in 24-well culture plates. Main fermentation samples were centrifuged to precipitate expression host cells and the supernatant was sterile filtered at 0.2 µm. The filtrate was used directly for lipase enzymatic activity characterization without further treatment. The activity was determined in tributyrin/agarose emulsion, for example as described below for Example 2 or by IDF method. In particular, the IDF method was used for dosing in Examples 3-6.

Example 2—Enzymatic Activity on Triacylglycerols (TAG) Substrates

The enzymatic activity of each microbial lipase herein disclosed (SEQ ID NO:1-11) towards short chain fatty acids ($C_4$, substrate tributyrin), as well as long chain fatty acids ($C_{16}$ and $C_{18}$, substrate olive oil), in 96-well plate assays, was performed as follows below. The same procedure (of determining the enzymatic activity towards short chain fatty acids ($C_4$, substrate tributyrin)) and long chain fatty acids ($C_{16}$ and $C_{18}$, substrate olive oil), in 96-well plate assays) was also conducted for a commercial microbial lipase from *Rhizomucour miehei* (Palatase®, Palatase® 20000 L, 20,000 U/g available from Novozymes A/S). The commercial microbial lipase from *Rhizomucour miehei* is herein labelled as commercial microbial lipase A.

Enzymatic activity for short chain fatty acids in plate: a tributyrin/agarose emulsion was generated by dissolving 1.4% low-melting agarose in 250 mM sodium acetate buffer pH 5.25 including 40 mM $CaCl_2$, addition of 1% (v/v) tributyrin to the solubilized agarose at 60° C., and subsequent emulsification for 2 min using an IKA T25 Ultra-Turrax emulsifier at speed 13.5. A total volume of 50 µL emulsion was transferred to each well of a transparent 96-well assay plate and allowed to solidify at room temperature. Lipase reaction was started by adding 20 µL enzyme on top of the emulsion layer, in particular wherein 20 µL enzyme correspond to 20 µL of filtrate obtained from Example 1. Clearance of turbidity of the emulsion by enzymatic hydrolysis of substrate tributyrin was followed by measuring absorbance at 600 nm in a plate reader. Each assay was calibrated with various dilutions of commercial microbial lipase A with known enzymatic activity.

Enzymatic activity for long chain fatty acids in plate: an olive oil/agarose emulsion was generated by dissolving 1.4% low-melting agarose in 250 mM sodium acetate buffer pH 5.25 including 40 mM $CaCl_2$, addition of 2.5% (v/v) olive oil and 0.001% rhodamine B (w/v) to the solubilized agarose at 60° C., and subsequent emulsification for 2 min using an IKA T25 Ultra-Turrax emulsifier at speed 13.5. A total volume of 150 µL emulsion was transferred to each well of a non-transparent black 96-well assay plate and allowed to solidify at room temperature. Lipase reaction was started by adding 30 µL enzyme on top of the emulsion layer, in particular wherein 30 µL enzyme correspond to 30 µL of filtrate obtained from Example 1. Binding of rhodamine B to long chain fatty acids released by enzymatic hydrolysis of substrate olive oil was followed by measuring fluorescence at 355 nm excitation and 590 nm emission in a plate reader. Each assay was calibrated with various dilutions of commercial microbial lipase A with known enzymatic activity.

Short chain fatty acid specificity $C_4/C_{16}$-$C_{18}$ was determined, for each microbial lipase herein disclosed, by calculating the ratio of hydrolytic activities on substrate tributyrin ($C_4$) and olive oil ($C_{16}$-$C_{18}$).

The ratio $C_4/C_{16}$-$C_{18}$ of each lipase (SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 and/or SEQ ID NO: 11) is normalized for the ratio $C_4/C_{16}$-$C_{18}$ of the microbial commercial lipase (A) used. Table 1 shows that the microbial lipases herein disclosed (SEQ ID NO: 1-11) have a higher specificity for the short chain fatty acid butyric acid ($C_4$) as compared to commercial microbial lipase A, in particular the microbial lipases of herein disclosed (SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 and/or SEQ ID NO: 11) are 2-770 times more $C_4$-fatty acid specific than the commercial microbial lipase A.

TABLE 1

Short chain fatty acid specificity ($C_4/C_{16}$-$C_{18}$) determined with TAG substrates tributyrin and olive oil of lipases with SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11 and commercial microbial lipase A and respective improvement factor (IF4).

| | $C_4/C_{16}$-$C_{18}$ | IF4 = $(C_4/C_{16}$-$C_{18})_{A\ or\ SEQ\ ID\ NO:\ 1\text{-}11}$ / $(C_4/C_{16}$-$C_{18})_A$ |
|---|---|---|
| A | 1.2 | 1.0 |
| 1 | 101.0 | 83.3 |
| 2 | 5.0 | 4.1 |
| 3 | 770.5 | 635.3 |
| 4 | 7.4 | 6.1 |
| 5 | 17.2 | 14.2 |
| 6 | 2.3 | 1.9 |
| 7 | 8.0 | 6.6 |
| 8 | 14.0 | 11.6 |
| 9 | 14.5 | 11.9 |
| 10 | 6.1 | 5.0 |
| 11 | 2.4 | 2.0 |

Example 3—Enzymatic Activity in Cream

The lipases herein disclosed (SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 or SEQ ID NO: 11), were additionally analyzed for their enzymatic activity towards milk fat and the released free fatty acids were quantified (Table 2). The same procedure was conducted for a commercial microbial lipase (commercial microbial lipase A) from *Rhizomucour miehei* (Palatase®) available from Novozymes A/S.

Lipase activity on milk fat in cream was carried out as follows. Fresh whipping cream (38% fat) and equal amounts of water were mixed by stirring for 30 min. Enzymatic reaction was started by adding 20 µL lipase (from a 4000 LFU/L stock solution) to 1 mL cream/water mix and proceeded at 37° C. for 20 hours, in particular this dosage of enzyme applies both to the commercial microbial lipase A and to lipases of SEQ ID NO: 1-11. Subsequently, free fatty acids were extracted from the reaction and quantified by gas chromatography-mass spectrometry (GC-MS), using standard protocols in the art for quantifying fatty acids. Alternatively the disclosure of Jong C., de and Badings H. T. in J. High Resolution Chromatography. 13, 84-98 (1990) can also be used.

Obtained fatty acid quantities of lipase reactions were corrected for the respective quantities determined for a similar cream sample without added lipase.

Subsequently, specificity for butyric acid ($C_{4:0}$), and caproic acid ($C_{6:0}$), caprylic acid ($C_{8:0}$) and capric acid ($C_{10:0}$) and the respective improvement factors compared to commercial microbial lipase A were determined based on the obtained data from lipolysis in cream (Table 2). Short chain fatty acid specificities ($C_4/C_{16}$-$C_{18}$; $C_6/C_{16}$-$C_{18}$) were obtained by calculating the ratio of the molar fraction of $C_{4:0}$ or $C_{6:0}$ and the sum of molar fractions of $C_{16:0}$, $C_{18:0}$, $C_{18:1}$ and $C_{18:2}$. Improvement factors IF4 and IF6 were calculated by dividing specificity values for $C_{4:0}$ and $C_{6:0}$ by the respective values of commercial lipase A. Medium chain fatty acid specificities ($C_8/C_{16}$-$C_{18}$; $C_{10}/C_{16}$-$C_{18}$) were obtained by calculating the ratio of the molar fraction of $C_{8:0}$ or $C_{10:0}$ and the sum of molar fractions of $C_{16:0}$, $C_{18:0}$, $C_{18:1}$ and $C_{18:2}$.

Improvement factors IF8 and IF10 were calculated by dividing specificity values for $C_{8:0}$ and $C_{10:0}$, respectively, by the respective values of commercial lipase A.

The ratio $C_4/C_{16}$-$C_{18}$ of each lipolytic lipase is determined by diving $C_{4:0}$ by the sum of $C_{16:0}$, $C_{18:0}$, $C_{18:1}$ and $C_{18:2}$ of the respective lipolytic lipase. The ratio $C_4/C_{16}$-$C_{18}$ is indicative of the specificity of the respective lipase for the release of butyric acid ($C_4$) from milk fat, relative to the release of fatty acids with chain lengths $C_{16}$-$C_{18}$.

The ratio $C_6/C_{16}$-$C_{18}$ of each lipolytic lipase is determined by diving $C_{6:0}$ by the sum of $C_{16:0}$, $C_{18:0}$, $C_{18:1}$ and $C_{18:2}$ of the respective lipolytic lipase. The ratio $C_6/C_{16}$-$C_{18}$ is indicative of the specificity of the respective lipase for the release of caproic acid ($C_6$) from milk fat, relative to the release of fatty acids with chain lengths $C_{16}$-$C_{18}$.

The ratio $C_8/C_{16}$-$C_{18}$ of each lipolytic lipase is determined by diving $C_{8:0}$ by the sum of $C_{16:0}$, $C_{18:0}$, $C_{18:1}$ and $C_{18:2}$ of the respective lipolytic lipase. The ratio $C_8/C_{16}$-$C_{18}$ is indicative of the specificity of the respective lipase for the release of caproic acid ($C_8$) from milk fat, relative to the release of fatty acids with chain lengths $C_{16}$-$C_{18}$.

The ratio $C_{10}/C_{16}$-$C_{18}$ of each lipolytic lipase is determined by diving $C_{10:0}$ by the sum of $C_{16:0}$, $C_{18:0}$, $C_{18:1}$ and $C_{18:2}$ of the respective lipolytic lipase. The ratio $C_{10}/C_{16}$-$C_{18}$ is indicative of the specificity of the respective lipase for the release of caproic acid ($C_{10}$) from milk fat, relative to the release of fatty acids with chain lengths $C_{16}$-$C_{18}$.

TABLE 2

Molar fractions of fatty acids released in cream by commercial microbial lipase A and SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 and SEQ ID NO: 11.

|    | $C_{4:0}$ | $C_{6:0}$ | $C_{8:0}$ | $C_{10:0}$ | $C_{12:0}$ | $C_{14:0}$ | $C_{16:0}$ | $C_{18:0}$ | $C_{18:1}$ | $C_{18:2}$ |
|----|------|------|------|------|------|------|------|------|------|------|
| A  | 1.2  | 0.5  | 0.9  | 1.2  | 2.2  | 10.3 | 41.7 | 21.4 | 19.5 | 1.1  |
| 1  | 82.5 | 5.4  | 1.3  | 1.2  | 0.5  | 1.3  | 3.1  | 1.7  | 2.9  | 0.1  |
| 2  | 15.3 | 2.6  | 5.5  | 7.8  | 3.2  | 3.9  | 21.4 | 8.8  | 31.5 | 0.0  |
| 3  | 87.6 | 2.2  | 1.0  | 0.3  | 0.6  | 1.8  | 3.3  | 1.5  | 1.5  | 0.1  |
| 4  | 15.6 | 4.2  | 4.3  | 0.0  | 4.2  | 3.2  | 19.6 | 17.3 | 18.6 | 13.0 |
| 5  | 11.0 | 8.7  | 2.8  | 0.9  | 2.8  | 9.8  | 32.3 | 13.8 | 15.7 | 2.3  |
| 6  | 3.1  | 4.7  | 5.8  | 1.8  | 5.8  | 4.6  | 21.7 | 17.3 | 0.0  | 6.3  |
| 7  | 8.0  | 1.6  | 0.6  | 1.6  | 2.1  | 9.4  | 39.1 | 14.6 | 21.1 | 1.8  |
| 8  | 17.5 | 0.0  | 2.3  | 3.8  | 3.6  | 4.3  | 19.9 | 14.3 | 32.8 | 1.4  |
| 9  | 31.3 | 4.1  | 1.6  | 0.6  | 3.5  | 16.1 | 28.8 | 3.8  | 10.1 | 0.0  |
| 10 | 18.0 | 24.2 | 9.5  | 7.5  | 3.6  | 6.9  | 8.0  | 6.3  | 14.2 | 1.8  |
| 11 | 22.4 | 8.5  | 9.8  | 12.9 | 4.3  | 4.3  | 5.8  | 3.5  | 27.4 | 1.1  |

TABLE 3

Short chain and medium chain fatty acid specificities ($C_4/C_{16}$-$C_{18}$, $C_6/C_{16}$-$C_{18}$, $C_8/C_{16}$-$C_{18}$, $C_{10}/C_{16}$-$C_{18}$) and improvement factors (IF4, IF6, IF8, IF10) in cream by commercial microbial lipase A and SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 and SEQ ID NO: 11.

|    | $C_4/C_{16}$-$C_{18}$ | $C_6/C_{16}$-$C_{18}$ | $C_8/C_{16}$-$C_{18}$ | $C_{10}/C_{16}$-$C_{18}$ | IF4 | IF6 | IF8 | IF10 |
|----|--------|--------|--------|--------|-------|-------|------|------|
| A  | 0.014  | 0.006  | 0.010  | 0.014  | 1.0   | 1.0   | 1.0  | 1.0  |
| 1  | 10.645 | 0.697  | 0.165  | 0.159  | 744.1 | 113.1 | 16.1 | 11.0 |
| 2  | 0.249  | 0.043  | 0.063  | 0.086  | 17.4  | 6.9   | 6.2  | 5.9  |
| 3  | 13.600 | 0.334  | 0.155  | 0.053  | 950.7 | 54.2  | 15.2 | 3.7  |
| 4  | 0.227  | 0.062  | 0.062  | 0.000  | 15.9  | 10.0  | 6.1  | 0.0  |
| 5  | 0.172  | 0.136  | 0.043  | 0.015  | 12.0  | 22.0  | 4.2  | 1.0  |
| 6  | 0.711  | 0.103  | 0.129  | 0.040  | 49.7  | 16.7  | 12.6 | 2.8  |
| 7  | 0.105  | 0.021  | 0.008  | 0.021  | 7.3   | 3.4   | 0.8  | 1.4  |
| 8  | 0.255  | 0.000  | 0.033  | 0.056  | 17.9  | 0.1   | 3.2  | 3.9  |
| 9  | 0.733  | 0096   | 0.039  | 0.015  | 51.2  | 15.6  | 3.8  | 1.0  |
| 10 | 0.594  | 0.797  | 0.314  | 0.247  | 41.5  | 129.2 | 30.7 | 17.0 |
| 11 | 0.595  | 0.226  | 0.261  | 0.342  | 41.6  | 26.6  | 25.5 | 23.7 |

All the microbial lipolytic enzymes herein disclosed (SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 and/or SEQ ID NO: 11) show an IF4 higher than 1, in cream, meaning they have a higher specificity for the short chain fatty acid butyric acid ($C_{4:0}$) compared to commercial lipase A (Table 3) and can, therefore, be successfully used in a process for producing a food product wherein the presence of short chain fatty acid butyric acid ($C_{4:0}$) is needed and desired, such as for reducing soapiness and increase in butyric flavors in a food product.

Microbial lipolytic enzymes with SEQ ID NO: 1-7 and SEQ ID NO: 9-11 show an IF6 higher, than 1 in cream, meaning they have a higher specificity for the short chain fatty acid caproic acid ($C_{6:0}$) compared to commercial lipase A.

Microbial lipolytic enzymes with SEQ ID NO: 1-6 and SEQ ID NO: 8-11 show an IF8 higher, than 1 in cream, meaning they have a higher specificity for the medium chain fatty acid caprylic acid ($C_{8:0}$) compared to commercial lipase A.

Microbial lipolytic enzymes with SEQ ID NO: 1-3, SEQ ID NO: 6-8 and SEQ ID NO: 10-11 show an IF10 higher, than 1 in cream, meaning they have a higher specificity for the medium chain fatty acid capric acid ($C_{10:0}$) compared to commercial lipase A.

Microbial lipolytic enzyme with SEQ ID NO: 1 has a higher specificity for $C_{4:0}$ than for any other fatty acid, in cream. The same applies for microbial lipolytic enzymes having SEQ ID NO: 3 or SEQ ID NO: 9 (Table 2).

Example 4—Enzymatic Activity in Cheese

SEQ ID NO: 1 was further tested in cheese, in particular in Feta cheese and in Provolone cheese (Table 4). Example 4 was carried out with an identical dosage of enzyme (commercial microbial lipase A and SEQ ID NO: 1), in particular with a dosage of about 1.7 LFU/L of enzyme per liter of milk was used for the production of Feta cheese and between 5-10× for the Provolone cheese. The dosage was determined by the IDF method.

Microbial lipase SEQ ID NO: 1 was added during the cheese making process. The cheese making process of, for example Feta cheese or Provolone cheese, is well known in the art and to the skilled person. Subsequently, free fatty acids were extracted from cheeses after 1 month of ripening and quantified by GC-MS or as disclosed in Example 3. Obtained fatty acid quantities of lipase reactions were corrected for the respective quantities determined for a similar cheese without added lipase. Short chain fatty acid specificities were obtained by calculating the ratio of the molar fraction of $C_{4:0}$ or $C_{6:0}$ and the sum of molar fractions of $C_{16:0}$, $C_{18:0}$, $C_{18:1}$ and $C_{18:2}$. Improvement factors IF4 and IF6 were calculated by dividing specificity values for $C_{4:0}$ and $C_{6:0}$ by the respective values of commercial lipase A.

TABLE 4

Molar fractions of fatty acids released in Feta cheese and Provolone cheese by commercial microbial lipase A and SEQ ID NO: 1, after 1-month of ripening, as well as short chain fatty acid specificities ($C_4/C_{16}$-$C_{18}$ and $C_6/C_{16}$-$C_{18}$) and improvement factors (IF4 and IF6).

|   | $C_{4:0}$ | $C_{6:0}$ | $C_{8:0}$ | $C_{10:0}$ | $C_{12:0}$ | $C_{14:0}$ | $C_{16:0}$ | $C_{18:0}$ | $C_{18:1}$ | $C_{18:2}$ | $C_4/C_{16}$-$C_{18}$ | $C_6/C_{16}$-$C_{18}$ | IF4 | IF6 |
|---|---|---|---|---|---|---|---|---|---|---|---|---|---|---|
| Feta cheese | | | | | | | | | | | | | | |
| A | 2.0 | 0.8 | 2.3 | 4.6 | 6.2 | 14.6 | 35.2 | 9.4 | 22.5 | 2.5 | 0.029 | 0.012 | 1.0 | 1.0 |
| 1 | 50.3 | 5.5 | 0.0 | 3.7 | 6.3 | 5.5 | 12.3 | 0.0 | 11.2 | 0.0 | 2.135 | 0.231 | 74.5 | 19.9 |
| Provolone cheese | | | | | | | | | | | | | | |
| A | 8.7 | 2.1 | 2.2 | 3.6 | 4.9 | 11.6 | 28.6 | 7.0 | 27.2 | 4.0 | 0.130 | 0.032 | 1.0 | 1.0 |
| 1 | 82.8 | 3.4 | 1.4 | 1.1 | 1.0 | 0.9 | 3.1 | 1.4 | 2.1 | 0.7 | 11.402 | 0.468 | 87.7 | 14.8 |

SEQ ID NO: 1 has a higher specificity for $C_{4:0}$-fatty acids than commercial microbial lipase A, in Feta cheese and in Provolone cheese, and a higher specificity for $C_{4:0}$-fatty acids than for any other fatty acid, both Feta cheese and Provolone cheese, which is in line with the results obtained in cream (Example 3). Further, SEQ ID NO: 1 also has a higher specificity for $C_{6:0}$-fatty acids than commercial microbial lipase A, in Feta cheese and in Provolone cheese, which is also in line with the results obtained in cream (Example 3).

SEQ ID NO: 1 also shows a lower specificity for medium to long chain fatty acids such as $C_{8:0}$, $C_{10:0}$, $C_{14:0}$, $C_{16:0}$, $C_{18:0}$, $C_{18:1}$ or $C_{18:2}$ fatty acids when compared to commercial microbial lipase A in Feta cheese. Furthermore, SEQ ID NO: 1 also shows a lower specificity for medium to long chain fatty acids such as $C_{8:0}$, $C_{10:0}$, $C_{12:0}$, $C_{14:0}$, $C_{16:0}$, $C_{18:0}$, $C_{18:1}$ or $C_{18:2}$ fatty acids when compared to commercial microbial lipase A in Provolone cheese. These results are in line with the results obtained in cream (Example 3). Thus, a cheese produced using a microbial lipase comprising SEQ ID NO: 1 or wherein the microbial lipase is microbial lipase of SEQ ID NO: 1 is less soapy and more butyric than a cheese produced with a known microbial lipase. Identical results are expected for SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10 and/or SEQ ID NO: 11.

Identical results are also expected for other types of cheese, such as Pecorino, Parmesan, Grana Padano, Parmigiano Reggiano, Romano, Chester, Danbo, Manchego, Saint Paulin, Cheddar, Monterey, Colby, Edam, Gouda, Muenster, Swiss type, Gruyere, Emmental; pasta filata cheeses such as Mozzarella, and Queso fresco cheese; fresh cheese such as Ricotta, Cream cheese, Neufchatel or Cottage cheese; cream cheese, white mold cheese such as Brie and Camembert cheese, blue mold cheese such as Gorgonzola and Danish blue cheese; processed cheese, cheese-like product, or an enzyme-modified cheese.

The microbial lipases herein disclosed are responsible for an increase in the $C_4$-fatty acid specificity in comparison with the prior art microbial lipases, thus leading to a reduced soapiness of cheese and an increase in the butyric flavor of cheese.

Example 5—Sensorial Evaluation

A sensorial evaluation of cheese, in particular in Feta cheese aged 3-months, was also performed by rating the taste according to sensational parameters butyric and soapy on a scale from 1 (none) to 6 (intense). The Feta cheese was produced using identical conditions using a commercial A or SEQ ID NO: 1 or SEQ ID NO: 3 or SEQ ID NO: 5. The amount or dosage of enzyme (commercial microbial lipase A, SEQ ID NO: 1 or SEQ ID NO: 3 or SEQ ID NO: 5) used was 1.7 LFU/L of milk determined by the IDF method (Table 5).

TABLE 5

Sensorial evaluation carried out with Feta cheese aged 3-months using of commercial microbial lipase A, SEQ ID NO: 1, SEQ ID NO: 3 and SEQ ID NO: 5.

| | Feta cheese aged 3-months | |
|---|---|---|
| | Butyric | Soapy |
| A | 3 | 5 |
| 1 | 4 | 1 |
| 3 | 4 | 1 |
| 5 | 4 | 3 |

Table 5 shows a reduction of soapiness in Feta cheese, aged 3-months when SEQ ID NO: 1 or 3 or 5 is used when compared with commercial lipase A, while simultaneously an increase in the butyric flavor is observed for the same samples.

Example 6—Enzymatic Activity in Cheese

SEQ ID NO: 1, 2, 3, 6, 8, 10 and 11 were further tested in cheese, in particular in Feta cheese. Example 6 was carried out with an identical dosage of enzyme (the commercial microbial lipase A and SEQ ID NO: 1, 2, 3, 6, 8, 10 and 11), in particular the a dosage of enzyme was of about 2.3 LFU/L of milk, determined by the IDF method, for the production of Feta cheese.

Microbial lipases SEQ ID NO: 1, 2, 3, 6, 8, 10 and 11 were individually added during the cheese making process. Subsequently, free fatty acids were extracted from cheeses after 1-month (Table 6) and 2-months (Table 8) of ripening and quantified by GC-MS or as disclosed in Example 3. Obtained fatty acid quantities of lipase reactions were corrected for the respective quantities determined for a similar cheese without added lipase. Short- and medium-chain fatty acid specificities were obtained by calculating the ratio of the molar fraction of $C_{4:0}$, $C_{6:0}$, $C_{8:0}$ or $C_{1.0:0}$ and the sum of molar fractions of $C_{16:0}$, $C_{16:1}$, $C_{18:0}$, $C_{18:1}$, $C_{18:2}$ and $C_{18:3}$ (Tables 7 and 9). Improvement factors IF4, IF6, IF8 and IF10 were calculated by dividing specificity values for $C_{4:0}$, $C_{6:0}$ $C_{8:0}$ or $C_{10:0}$ by the respective values of commercial lipase A (Tables 7 and 9).

TABLE 6

Molar fractions of fatty acids released in Feta cheese by commercial microbial lipase A and SEQ ID NO: 1, 2, 3, 6, 10 and 11, after 1-monthh of ripening. All lipases were dosage at 2.3 LFU/L.

|    | $C_{4:0}$ | $C_{6:0}$ | $C_{8:0}$ | $C_{10:0}$ | $C_{12:0}$ | $C_{14:0}$ | $C_{16:0}$ | $C_{16:1}$ | $C_{18:0}$ | $C_{18:1}$ | $C_{18:2}$ | $C_{18:3}$ |
|----|------|------|------|------|------|------|------|------|------|------|------|------|
| A  | 4.3  | 3.1  | 8.5  | 15.6 | 12.7 | 15.4 | 24.8 | 1.5  | 4.7  | 8.2  | 0.8  | 0.4  |
| 1  | 84.2 | 3.8  | 2.1  | 2.3  | 1.7  | 1.4  | 2.2  | 0.2  | 0.9  | 0.9  | 0.2  | 0.0  |
| 2  | 22.8 | 17.6 | 9.1  | 9.6  | 3.9  | 5.7  | 15.4 | 0.8  | 5.2  | 8.7  | 0.9  | 0.3  |
| 3  | 88.0 | 6.7  | 1.5  | 0.9  | 1.9  | 0.7  | 0.0  | 0.3  | 0.0  | 0.0  | 0.0  | 0.0  |
| 6  | 5.2  | 8.7  | 15.8 | 17.7 | 9.9  | 10.3 | 15.1 | 1.2  | 5.4  | 9.1  | 1.1  | 0.4  |
| 10 | 15.9 | 26.7 | 18.2 | 14.6 | 5.4  | 5.4  | 5.7  | 0.8  | 1.6  | 5.0  | 0.5  | 0.2  |
| 11 | 24.9 | 9.0  | 13.2 | 19.6 | 5.8  | 4.9  | 6.5  | 1.2  | 1.1  | 12.1 | 1.3  | 0.5  |

TABLE 7

Short- and medium-chain fatty acid specificities ($C_4/C_{16}$-$C_{18}$, $C_6/C_{16}$-$C_{18}$, $C_8/C_{16}$-$C_{18}$, $C_{10}/C_{16}$-$C_{18}$) and improvement factors (IF4, IF6, IF8, IF10) in Feta cheese by commercial microbial lipase A and SEQ ID NO: 1, 2, 3, 6, 10 and 11, after 1-monthh of ripening. All lipases were dosage at 2.3 LFU/L.

|    | $C_4/C_{16}$-$C_{18}$ | $C_6/C_{16}$-$C_{18}$ | $C_8/C_{16}$-$C_{18}$ | $C_{10}/C_{16}$-$C_{18}$ | IF4 | IF6 | IF8 | IF10 |
|----|--------|--------|--------|--------|--------|--------|------|------|
| A  | 0.107  | 0.076  | 0.211  | 0.386  | 1.0    | 1.0    | 1.0  | 1.0  |
| 1  | 18.733 | 0.837  | 0.478  | 0.511  | 175.7  | 11.1   | 2.3  | 1.3  |
| 2  | 0.730  | 0.564  | 0.291  | 0.307  | 6.8    | 7.5    | 1.4  | 0.8  |
| 3  | 291.602| 22.318 | 4.936  | 2.953  | 2734.9 | 294.8  | 23.4 | 7.7  |
| 6  | 0.160  | 0.270  | 0.489  | 0.546  | 1.5    | 3.6    | 2.3  | 1.4  |
| 10 | 1.158  | 1.943  | 1.327  | 1.060  | 10.9   | 25.7   | 6.3  | 2.7  |
| 11 | 1.097  | 0.397  | 0.583  | 0.864  | 10.3   | 5.2    | 2.8  | 2.2  |

All the tested microbial lipolytic enzymes show an IF4 higher than 1, in Feta cheese, after 1-month of ripening. Thus, the tested enzymes have a higher specificity for the short chain fatty acid butyric acid ($C_{4:0}$) compared to commercial lipase A (Table 7) and can, therefore, be successfully used in a process for producing a food product wherein the presence of short chain fatty acid butyric acid ($C_{4:0}$) is needed and desired, such as for reducing soapiness and increase in butyric flavors in a food product. This observation, of an IF higher than 1 for the tested lipases, is in line with the results of Example 3, where data was obtained in cream. Further, specifically for SEQ ID NO: 1, this observation is also in line with the results of Example 4.

Further, these enzymes show an IF6, IF8 and IF10 higher than 1, in Feta cheese, after 1-month of ripening, meaning they have a higher specificity for the short chain fatty acid caproic acid ($C_{6:0}$) and for medium chain fatty acid caprylic acid ($C_{8:0}$) and capric acid ($C_{10:0}$) compared to commercial lipase A, with the exception of SEQ ID NO: 2 which has a IF10 below 1. The results obtained for these sequences (SEQ ID NO: 1, 2, 3, 6, 10 and 11) and their specificity for $C_{6:0}$-fatty acids, $C_{8:0}$-fatty acids and $C_{10:0}$-fatty acids are essentially in line with the results obtained in cream (Example 3).

In conclusion, the results obtained in cheese, after 1-month of ripening (Example 4 and 6) are in line with the results obtained in cream (Example 3), showing that the results obtained in cream can be used to plausibly extrapolate the behavior of the non-tested sequences from cream to cheese.

TABLE 8

Molar fractions of fatty acids released in Feta cheese by commercial microbial lipase A and SEQ ID NO: 1, 2, 3, 6, 8, 10 and 11, after 2-monthh of ripening. All lipases were dosage at 2.3 LFU/L.

|    | $C_{4:0}$ | $C_{6:0}$ | $C_{8:0}$ | $C_{10:0}$ | $C_{12:0}$ | $C_{14:0}$ | $C_{16:0}$ | $C_{16:1}$ | $C_{18:0}$ | $C_{18:1}$ | $C_{18:2}$ | $C_{18:3}$ |
|----|------|------|------|------|------|------|------|------|------|------|------|------|
| A  | 4.3  | 2.3  | 9.3  | 17.3 | 13.7 | 14.3 | 20.1 | 1.5  | 4.2  | 10.9 | 1.4  | 0.7  |
| 1  | 69.4 | 5.6  | 5.3  | 6.4  | 2.3  | 2.8  | 4.0  | 0.4  | 0.3  | 3.1  | 0.3  | 0.1  |
| 2  | 17.8 | 17.5 | 9.6  | 13.6 | 5.0  | 6.3  | 15.4 | 0.8  | 5.0  | 7.9  | 0.8  | 0.3  |
| 3  | 94.2 | 0.9  | 2.0  | 0.7  | 0.0  | 0.0  | 0.8  | 0.0  | 1.0  | 0.4  | 0.0  | 0.0  |
| 6  | 6.5  | 4.8  | 11.2 | 15.9 | 11.2 | 12.7 | 17.4 | 1.5  | 5.0  | 12.0 | 1.4  | 0.6  |
| 8  | 36.6 | 14.2 | 9.1  | 12.7 | 3.8  | 5.6  | 9.8  | 0.6  | 2.4  | 4.5  | 0.6  | 0.3  |
| 10 | 16.0 | 27.9 | 18.6 | 17.0 | 5.3  | 5.4  | 3.4  | 0.6  | 0.7  | 4.6  | 0.4  | 0.2  |
| 11 | 32.7 | 7.5  | 13.2 | 22.0 | 4.6  | 4.0  | 3.7  | 0.8  | 1.0  | 9.3  | 0.8  | 0.4  |

TABLE 9

Short- and medium-chain fatty acid specificities ($C_4/C_{16}$-$C_{18}$, $C_6/C_{16}$-$C_{18}$, $C_8/C_{16}$-$C_{18}$, $C_{10}/C_{16}$-$C_{18}$) and improvement factors (IF4, IF6, IF8, IF10) in Feta cheese by commercial microbial lipase A and SEQ ID NO: 1, 2, 3, 6, 8, 10 and 11, after 2-monthh of ripening. All lipases were dosage at 2.3 LFU/L.

|    | $C_4/$ $C_{16}$-$C_{18}$ | $C_6/$ $C_{16}$-$C_{18}$ | $C_8/$ $C_{16}$-$C_{18}$ | $C_{10}/$ $C_{16}$-$C_{18}$ | IF4 | IF6 | IF8 | IF10 |
|----|-------|-------|-------|-------|-------|------|-----|-----|
| A  | 0.112 | 0.059 | 0.239 | 0.444 | 1.0   | 1.0  | 1.0 | 1.0 |
| 1  | 8.357 | 0.669 | 0.635 | 0.776 | 74.8  | 11.2 | 2.7 | 1.7 |
| 2  | 0.588 | 0.577 | 0.319 | 0.449 | 5.3   | 9.7  | 1.3 | 1.0 |
| 3  | 42.932| 0.410 | 0.908 | 0.304 | 384.3 | 6.9  | 3.8 | 0.7 |
| 6  | 0.172 | 0.126 | 0.296 | 0.420 | 1.5   | 2.1  | 1.2 | 0.9 |
| 8  | 2.024 | 0.785 | 0.504 | 0.705 | 18.1  | 13.2 | 2.1 | 1.6 |
| 10 | 1.607 | 2.807 | 1.870 | 1.707 | 14.4  | 47.2 | 7.8 | 3.8 |
| 11 | 2.044 | 0.469 | 0.829 | 1.377 | 18.3  | 7.9  | 3.5 | 3.1 |

All the tested microbial lipolytic enzymes show an IF4 higher than 1, in Feta cheese, after 2-month of ripening. Thus, the tested enzymes have a higher specificity for the short chain fatty acid butyric acid ($C_{4:0}$) compared to commercial lipase A (Table 7) and can, therefore, be successfully used in a process for producing a food product wherein the presence of short chain fatty acid butyric acid ($C_{4:0}$) is needed and desired, such as for reducing soapiness and increase in butyric flavors in a food product.

Microbial lipolytic enzymes with SEQ ID NO: 1, 2, 3, 6, 8, 10 and 11 show an IF6 and IF8 higher than 1, meaning they have a higher specificity for the short chain fatty acid caproic acid ($C_{6:0}$) and for medium chain fatty acid caprylic acid ($C_{8:0}$) compared to commercial lipase A.

The tested enzymes, with the exception of SEQ ID NO: 3, also shown an IF10 higher than 1, and have, therefore, a higher specificity for medium chain fatty capric acid ($C_{10:0}$) compared to commercial lipase A.

Further and as previously mentioned this invention relates to flavor enhancement but also with shortening of the ripening times for ripened cheeses. The comparison between free fatty acid profiles after 1-month or 2-months of ripening shows that it is possible to successfully reduce ripening time from 2-months (or more) to 1-month (or less), while the cheese still presents the desired short-chain fatty acid profile.

Identical results to those disclosed in Example 6 are also expected for other types of cheese, such as Pecorino, Parmesan, Grana Padano, Parmigiano Reggiano, Romano, Chester, Danbo, Manchego, Saint Paulin, Cheddar, Monterey, Colby, Edam, Gouda, Muenster, Swiss type, Gruyere, Emmental; pasta filata cheeses such as Mozzarella, and Queso fresco cheese; fresh cheese such as Ricotta, Cream cheese, Neufchatel or Cottage cheese; cream cheese, white mold cheese such as Brie and Camembert cheese, blue mold cheese such as Gorgonzola and Danish blue cheese; processed cheese, cheese-like product, or an enzyme-modified cheese.

In conclusion, the present invention discloses microbial wild-type lipases with a higher specificity for short chain fatty acids, specially $C_4$-fatty acid, than the known prior art microbial lipases, leading to a reduction in soapiness and an increase in butyric flavors of a food product such as cheese. Therefore, this invention provides microbial wild-type lipases which fulfill the vegetarian and/or kosher requirements, while simultaneously showing higher specificity for short chain fatty acids, specially $C_4$-fatty acid and lower specificity for medium to long chain fatty acids from milk fat and/or other fat, specially showing lower specificity for long chain fatty acids from milk fat and/or other fat, thereby avoiding an extremely unpleasant soapy taste in a food product, like cheese.

The present invention can be applied to other kinds of food products wherein the purpose is to reduce the unpleasant soapy taste of said food product.

Finally, if needed, the ripening time of the food product can be reduced from 2-months to 1-month, in particular in Feta cheese, while still maintaining the proper and desired short-chain fatty acid profile.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

List of preferred embodiments in a claim format

1. Lipase comprising an amino acid sequence having at least 90% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, or having at least 95%, 96%, 97%, 98% or 99% identity with SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1, or wherein the sequence is SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9 or SEQ ID NO: 10 or SEQ ID NO: 11, preferably SEQ ID NO: 1, preferably SEQ ID NO: 1 or SEQ ID NO: 3 or SEQ ID NO: 9 or SEQ ID NO: 11, more preferably SEQ ID NO: 1 or SEQ ID NO: 3 or SEQ ID NO: 11, even more preferably SEQ ID NO: 1.
2. Lipase according to the previous item, wherein said lipase has a higher specificity towards the release of $C_4$-fatty acids from a dairy composition comprising milk fat and/or other fat if compared with the release of $C_{10}$-fatty acids.
3. Lipase according to any of the previous items, wherein said lipase has a higher specificity towards the release of $C_4$-fatty acids from a dairy composition comprising milk fat and/or other fat if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acids-$C_{16:0}$-fatty acids or if compared with the release of $C_{16}$-$C_{18}$-fatty acids.

4. Lipase according to any of the previous items, wherein said lipase has a higher specificity towards the release of $C_4$-fatty acids from a dairy composition comprising milk fat and/or other fat if compared with the release of $C_{10}$-fatty acids at a pH below 7, preferably 6.6-6.8, or at a pH below 6, preferably at a pH between 3.8-5.6, more preferably at a pH between 4.4-5.4, even more preferably at a pH between 4.6-5.2, or if compared with the release of $C_6$-fatty acids or if compared with the release of $C_8$-fatty acids or if compared with the release of $C_{12}$-fatty acids or if compared with the release of $C_{14}$-fatty acids or if compared with the release of $C_{16}$-fatty acids or if compared with the release of $C_{18:1}$-fatty acids or if compared with the release of $C_{18:2}$-fatty acids or if compared with the release of $C_{18:3}$-fatty acids or if compared with the release of $C_{16}$-$C_{18}$-fatty acids.

5. Lipase according to any of the previous items, wherein said wherein said lipase has a higher specificity towards the release of $C_4$-fatty acids from a dairy composition comprising milk fat and/or other fat if compared with the release of $C_{10}$-fatty acids at a temperature below 20° C., preferably below 15° C., more preferably below 10° C., even more preferably between 5-8° C., or if compared with the release of $C_6$-fatty acids or if compared with the release of $C_8$-fatty acids or if compared with the release of $C_{12}$-fatty acids or if compared with the release of $C_{14}$-fatty acids or if compared with the release of $C_{16}$-fatty acids or if compared with the release of $C_{18:1}$-fatty acids or if compared with the release of $C_{18:2}$-fatty acids or if compared with the release of $C_{18:3}$-fatty acid or if compared with the release of $C_{16}$-$C_{18}$-fatty acids.

6. Lipase according to any of the previous items, wherein said lipase is a microbial lipase, preferably an isolated microbial lipase, a recombinant microbial lipase or a synthetic microbial lipase.

7. Isolated DNA sequence or recombinant DNA sequence or synthetic DNA sequence encoding a lipase according to any of the preceding items, preferably wherein the isolated DNA sequence or recombinant DNA sequence or synthetic DNA is selected from a sequence having at least 90%, or at least 95%, or at least 96%, or at least 97%, or at least 98% or at least 99%, or 100% sequence identity with SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23.

8. DNA sequence according to the preceding item further comprising a signal peptide sequence.

9. Vector comprising an isolated DNA sequence or recombinant DNA sequence or synthetic DNA sequence according to any of the previous items 7-8.

10. Host cell, preferably a recombinant host cell, comprising a sequence according to any of the previous items 1-8 or a vector according to previous item 9.

11. Host cell according to the previous item, wherein the host cell is selected from *Pichia pastoris*, *Aspergillus* or *Bacillus subtilis*, preferably *Pichia pastoris* or *B. subtilis*, more preferably *Pichia pastoris*.

12. Method for preparing a food product comprising a step of using a lipase comprising an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11; or
    using a DNA sequence encoding a lipase, wherein the DNA sequence is selected from a sequence having at least 90%, or at least 95%, or at least 96%, or at least 97%, or at least 98% or at least 99%, or 100% sequence identity with SEQ ID NO: 12 or SEQ ID NO: 13 or SEQ ID NO: 14 or SEQ ID NO: 15 or SEQ ID NO: 16 or SEQ ID NO: 17 or SEQ ID NO: 18 or SEQ ID NO: 19 or SEQ ID NO: 20 or SEQ ID NO: 21 or SEQ ID NO: 22 or SEQ ID NO: 23, preferably having at least 90%, or at least 95%, or at least 96%, or at least 97%, or at least 98% or at least 99%, or 100% sequence identity with SEQ ID NO: 12 or SEQ ID NO: 13 or SEQ ID NO: 14 or SEQ ID NO: 20 or SEQ ID NO: 22 or SEQ ID NO: 23; preferably wherein the DNA sequence is an isolated DNA sequence or a recombinant DNA sequence or a synthetic DNA sequence, more preferably wherein the DNA sequence comprises a signal peptide sequence.

13. Method according to the previous item 12, wherein said lipase has a higher specificity towards the release of $C_4$-fatty acids from a dairy composition comprising milk fat and/or other fat if compared with the release of $C_{10}$-fatty acids or if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acids-$C_{16:0}$-fatty acids or if compared with the release of $C_{16}$-$C_{18}$-fatty acids.

14. Method according to any of the previous items 12-13, wherein said lipase has a higher specificity towards the release of $C_4$-fatty acids from a dairy composition comprising milk fat and/or other fat if compared with the release of $C_{10}$-fatty acids at a pH below 7, preferably 6.6-6.8, or at a pH below 6, preferably at a pH between 3.8-5.6, more preferably at a pH between 4.4-5.4, even more preferably at a pH between 4.6-5.2, or if compared with the release of $C_6$-fatty acids or if compared with the release of $C_8$-fatty acids or if compared with the release of $C_{12}$-fatty acids or if compared with the release of $C_{14}$-fatty acids or if compared with the release of $C_{16}$-fatty acids or if compared with the release of $C_{18:1}$-fatty acids or if compared with the release of $C_{18:2}$-fatty acids or if compared with the release of $C_{18:3}$-fatty acid or if compared with the release of $C_{16}$-$C_{18}$-fatty acids.

15. Method according to any of the previous items 12-14, wherein said wherein said lipase has a higher specificity towards the release of $C_4$-fatty acids from a dairy composition comprising milk fat and/or other fat if compared with the release of $C_{10}$-fatty acids at a temperature below 20° C., preferably below 15° C., more preferably below 10° C., even more preferably between 5-8° C., or if compared with the release of $C_6$-fatty acids or if compared with the release of $C_8$-fatty acids or if compared with the release of $C_{12}$-fatty acids or if compared with the release of $C_{14}$-fatty acids or if compared with the release of $C_{16}$-fatty acids or if compared with the release of $C_{18:1}$-fatty acids or if compared with the release of $C_{18:2}$-fatty acids or if compared with the release of $C_{18:3}$-fatty acid or if compared with the release of $C_{16}$-$C_{18}$-fatty acids.

16. Method according to any of the previous items 12-15, wherein said lipase is a microbial lipase, preferably an isolated microbial lipase, a recombinant microbial lipase or a synthetic microbial lipase.

17. Method according to any of the previous items 12-16, wherein the food product is a dairy product selected from a cheese, or a processed cheese, or a cheese-like product, or an enzyme-modified cheese, or a butter, or a yogurt, or a cream, or a seasoning.

18. Method according to the previous items 12-17, wherein the dairy product is a cheese, preferably wherein the cheese is Feta cheese, or Provolone cheese, or Pecorino cheese, or Parmesan cheese, or Grana Padano cheese, or Parmigiano Reggiano cheese, or Romano cheese, or Chester cheese, or Danbo cheese, or Manchego cheese, or Saint Paulin cheese, or Cheddar cheese, or Monterey cheese, or Colby cheese, or Edam cheese, or Gouda cheese, or Muenster cheese, or Swiss type cheese, or Gruyere cheese, or Emmental cheese; or pasta filata cheeses such as Mozzarella, and Queso fresco cheese; or fresh cheese such as Ricotta, Cream cheese, Neufchatel or Cottage cheese; or cream cheese, or white mold cheese such as Brie and Camembert cheese, or blue mold cheese such as Gorgonzola and Danish blue cheese.

19. Method according to previous item 12, wherein the food product is a non-dairy product, preferably a non-dairy cheese or vegan cheese, preferably wherein the lipase has a higher specificity towards the release of $C_4$-fatty acids from a composition comprising fat such as vegetable fat or from a water-in-oil emulsion if compared with the release of $C_{10}$-fatty acids or if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acids-$C_{16:0}$-fatty acids or if compared with the release of $C_{16}$-$C_{18}$-fatty acids.

20. Food product comprising a lipase, wherein the lipase comprises an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11, and wherein the food product comprises more $C_4$-fatty acids than $C_{10}$-fatty acids or than any other fatty acid selected from $C_6$-fatty acids or $C_8$-fatty acids or $C_{12}$-fatty acids or $C_{14}$-fatty acids or $C_{16}$-fatty acids or $C_{18:1}$-fatty acids or $C_{18:2}$-fatty acids or $C_{18:3}$-fatty acids and/or wherein the food product comprises more $C_6$-fatty acids than $C_{10}$-fatty acids or than any other fatty acid selected from $C_8$-fatty acids or $C_{12}$-fatty acids or $C_{14}$-fatty acids or $C_{16}$-fatty acids or $C_{18:1}$-fatty acids or $C_{18:2}$-fatty acids or $C_{18:3}$-fatty acids.

21. Food product according to the previous item 20, wherein the food product is a dairy product selected from a cheese, a processed cheese, a cheese-like product, or a butter, a yogurt, a cream, a seasoning, preferably wherein the cheese is Feta cheese, or Provolone cheese, or Pecorino cheese, or Parmesan cheese, or Grana Padano cheese, or Parmigiano Reggiano cheese, or Romano cheese, or Chester cheese, or Danbo cheese, or Manchego cheese, or Saint Paulin cheese, or Cheddar cheese, or Monterey cheese, or Colby cheese, or Edam cheese, or Gouda cheese, or Muenster cheese, or Swiss type cheese, or Gruyere cheese, or Emmental cheese; or pasta filata cheeses such as Mozzarella, and Queso fresco cheese; or fresh cheese such as Ricotta, Cream cheese, Neufchatel or Cottage cheese; or cream cheese, or white mold cheese such as Brie and Camembert cheese, or blue mold cheese such as Gorgonzola and Danish blue cheese, more preferably Feta cheese or Provolone cheese; or wherein the food product is a non-dairy product such as a non-dairy cheese or vegan cheese.

22. Use of a lipase, for producing a food product,
wherein the food product is a dairy product selected from a cheese, or a processed cheese, or an enzyme-modified cheese (EMC), or a cheese-like product, or a butter, or a yogurt, or a cream, or a seasoning, preferably for producing cheese, such as Feta cheese, or Provolone cheese, or Pecorino cheese, or Parmesan cheese, or Grana Padano cheese, or Parmigiano Reggiano cheese, or Romano cheese, or Chester cheese, or Danbo cheese, or Manchego cheese, or Saint Paulin cheese, or Cheddar cheese, or Monterey cheese, or Colby cheese, or Edam cheese, or Gouda cheese, or Muenster cheese, or Swiss type cheese, or Gruyere cheese, or Emmental cheese; or pasta filata cheeses such as Mozzarella, and Queso fresco cheese; or fresh cheese such as Ricotta, Cream cheese, Neufchatel or Cottage cheese; or cream cheese, or white mold cheese such as Brie and Camembert cheese, or blue mold cheese such as Gorgonzola and Danish blue cheese; more preferably the cheese is Feta cheese or Provolone cheese; or wherein the food product is a non-dairy product such as a non-dairy cheese or vegan cheese;

and wherein the lipase comprises an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11.

23. Use of a lipase for producing or releasing more $C_4$-fatty acids and/or $C_6$-fatty acids from a dairy composition comprising milk fat and/or other fat, such as vegetable fat, than for producing or releasing more $C_8$-fatty acids, $C_{10}$-fatty acids, $C_{12}$-fatty acids, $C_{14}$-fatty acids, $C_{16}$-fatty acids, $C_{18:0}$-fatty acids, $C_{18:1}$-fatty acids, or $C_{18:2}$-fatty acids, or $C_{18:3}$-fatty acids, wherein the lipase comprises an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11, preferably wherein said lipase has a higher specificity towards the release of $C_4$-fatty acids from a dairy composition comprising milk fat and/or other fat if compared with the release of $C_{10}$-fatty acids or if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acids-$C_{16:0}$-fatty acids or if compared with the release of $C_{16}$-$C_{18}$-fatty acids.

24. Use of a lipase for producing or releasing more $C_4$-fatty acids and/or $C_6$-fatty acids in a food product than for producing or releasing more $C_8$-fatty acids, $C_{10}$-fatty acids, $C_{12}$-fatty acids, $C_{14}$-fatty acids, $C_{16}$-fatty acids, $C_{18:0}$-fatty acids, $C_{18:1}$-fatty acids, or $C_{18:2}$-fatty acids, or $C_{18:3}$-fatty acids in the food product, wherein the lipase comprises an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11, preferably wherein the food product is a dairy product selected from a cheese, or a processed cheese, or enzyme-modified cheese, or a cheese-like product, or a butter, or a yogurt, or a cream, or a seasoning, or preferably wherein the food product is a non-dairy product such as a non-dairy cheese or vegan cheese.

25. Use according to the previous item 24, wherein the food product is a dairy product selected from a cheese and wherein the cheese is Feta cheese, or Provolone cheese, or Pecorino cheese, or Parmesan cheese, or Grana Padano cheese, or Parmigiano Reggiano cheese, or Romano cheese, or Chester cheese, or Danbo cheese, or Manchego cheese, or Saint Paulin cheese, or Cheddar cheese, or Monterey cheese, or Colby cheese, or Edam cheese, or Gouda cheese, or Muenster cheese, or Swiss type cheese, or Gruyere cheese, or Emmental cheese; or pasta filata cheeses such as Mozzarella, and Queso fresco cheese; or fresh cheese such as Ricotta, Cream cheese, Neufchatel or Cottage cheese; or cream cheese, or white mold cheese such as Brie and Camembert cheese, or blue mold cheese such as Gorgonzola and Danish blue cheese, preferably Feta cheese or Provolone cheese.

26. Lipase consisting of an amino acid sequence having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 4 or SEQ ID NO: 5 or SEQ ID NO: 6 or SEQ ID NO: 7 or SEQ ID NO: 8 or SEQ ID NO: 9 or SEQ ID NO: 10 or SEQ ID NO: 11, preferably having at least 90%, or at least 95%, or at least 96%, or at least 97%, or at least 98%, or at least 99% or 100% identity with SEQ ID NO: 1 or SEQ ID NO: 2 or SEQ ID NO: 3 or SEQ ID NO: 9 or SEQ ID NO: 11;

wherein the lipase is expressed in *Pichia pastoris* and has a higher specificity towards the release of $C_4$-fatty acids from a dairy composition comprising milk fat and/or other fat if compared with the release of $C_{10}$-fatty acids, or if compared with the release of $C_8$-fatty acids, or if compared with the release of $C_6$-fatty acids, or if compared with the release of $C_{12}$-fatty acids or if compared with the release of $C_{18:2}$-fatty acids or if compared with the release of $C_{14}$-fatty acids or if compared with the release of $C_{18:0}$-fatty acids or if compared with the release of $C_{18:1}$-fatty acids or if compared with the release of $C_{16}$-fatty acids, or if compared with the release of $C_8$-fatty acids-$C_{18:2}$-fatty acids, or if compared with the release of $C_{10}$-fatty acids-$C_{18:1}$-fatty acids, or if compared with the release of $C_{12}$-fatty acids-$C_{18:0}$-fatty acids, or if compared with the release of $C_{14}$-fatty acid—$C_{16:0}$-fatty acids or if compared with the release of $C_{16}$-$C_{18}$-fatty acids.

27. Lipase according to item 26, wherein the lipase is used in any of the methods or uses herein disclosed.

REFERENCES

Non Patent Literature

Iwai, M. et al. Studies on Lipase II. Hydrolytic and esterifying actions of crystalline lipase of *Aspergillus niger*. J. Gen. Appl. Microbiol. 10, 13-22 (1964)

Oi, S. et al. Purification and Some Properties of a Fungal Lipase Preparation Used for Milk Flavouring. Agr. Biol. Chem. 33, 729-38 (1969)

Somkuti, G. A. et al. Lipase Activity of *Mucor pusillus*. Appl. Microbiol. 16, 617-19 (1968)

Kamoun, J. et al. Biochemical characterization of *Yarrowia lipolytica* LIP5, a secreted lipase with a cleavable C-terminal region. Biochim. Biophys. Acta 1851, 129-140 (2015)

Aloulou, A. et al. Purification and biochemical characterization of the LIP2 lipase from *Yarrowia lipolytica*. Biochim. Biophys. Acta—Mol. Cell Biol. Lipids 1771, 228-237 (2007)

Sheng, J., Wang, F., Wang, H. & Sun, M. Cloning, characterization and expression of a novel lipase gene from marine psychrotrophic *Yarrowia lipolytica*. Ann. Microbiol. 62, 1071-1077 (2012)

J. Sambrook, E. F. Fritsch, and T. Maniatis, 1989, Molecular Cloning: A Laboratory manual, $2^{nd}$ edition, books 1-3, Cold Spring Harbor Laboratory Press Jong C., de and Badings H. T. Determination of free fatty acids in milk and cheese procedures for extraction, clean up, and capillary gas chromatographic analysis J. High Resolution Chromatography, 13, 84-98 (1990)

Patent Literature

U.S. Pat. Nos. 4,726,954; 4,636,468; US2005059130; EP2290059; EP3081644; EP2254996; EP1776455

```
SEQUENCE LISTING
                                                         >SEQ ID NO: 1
MVLSTVIGEWFSRVLFGTVAPSPLTATAPISQDFYDTALTFSHLSNVAYCINTPLESLKSDFSCGVACSHFPNMELV

EEFGGEFFETSITGFLSIDHVKKEKYVVYRGTYDIGDVYTDIQLSQSPFLVTPSALGSTANLCEGCTIHDGWNKAYN

ETMGIIGDKLADHVNSNPDYRLVVTGHSLGAAIAVLSATSLKVNGQDPYLYTYGQPRIGNANFANFVSKQWFGEGDG

LSMDSDRRYFRLTHWNDLFVGFPAFKDYVHSVGEIYIDYFTVQPPLNKVFSCAGPESMSCYRKDFNALARLDIVKNH

LAYFDWISLCTLNIGRRDLERGRKFEGTWLYGGLANGSTIF
                                                         >SEQ ID NO: 2
AVLQKRVYTSTETSHIDQESYNFFEKYARLANIGYCVGPGTKIFKPFNCGLQCAHFPNVELIEEFHDPRLIFDVSGY

LAVDHASKQIYLVIRGTHSLEDVITDIRIMQAPLTNFDLAANISSTATCDDCLVHNGFIQSYNNTYNQIGPKLDSVI

EQYPDYQIAVTGHSLGGAAALLFGINLKVNDHDPLVVTLGQPIVGNAGFANWVDKLFFGQENPDVSKVSKDRKLYRI

THRGDIVPQVPFWDGYQHCSGEVFIDWPLIHPPLSNVVMCQGQSNKQCSAGNTLLQQVNVIGNHLQYFVTEGVCGI
                                                         >SEQ ID NO: 3
QTAPITQETYDFVLKYGWLSNVAYCVRAPGPFALQSDFTCGNSCAHFPDVTLDYQFGGNFFSTSVTGFLAHDHTKKE

KYIVFRGTFSIADAITDIQTIQQPYMTSIPPLNTTDINSTNPSASINCPGCQVHDGFQKAYRETMVNVQDRLVDFLG

NNTDYKLIVTGHSLGAVTALFMGINLKNLGYDPTLINYGQPRLGNKAFADYVDALFFKQGDDGLTINPERRMYRVTH

WNDFFVGWPAGYSHTLGEVYISDPTGINAPIEDVYSCAGPENNQCHHGSFNLLERLNILKNHCGYLNWIFYCAINVD

KREMMIDPPRVGKRVEHWSGKFSDVESTEGLMYEAIYPM
                                                         >SEQ ID NO: 4
APAPAPMQRRDISSTVLDNIDLFAQYSAAAYCSSNIESTGTTLTCDVGNCPLVEAAGATTIDEFDDSSSYGDPTGFI

AVDPTNELIVLSFRGSSDLSNWIADLDFGLTSVSSICDGCEMHKGFYEAWEVIADTITSKVEAAVSSYPDYTLVFTG

HSYGAALAAVAATVLRNAGYTLDLYNFGQPRIGNLALADYITDQNMGSNYRVTHTDDIVPKLPPELLGYHHFSPEYW

ITSGNDVTVTTSDVTEVVGVDSTAGNDGTLLDSTTAHRWYTIYISECS
                                                         >SEQ ID NO: 5
VPMLQSRATSDPAEWTELHRAAQLSSAAYTGCTGSAFDVTITKQINELVTDTQGFIGYSTEKKRITVAMRGSTSATD

IANDVDTTLVEPTLSGVNFPSGAKMMHGIYSPWSSVHDDVISEVKSLVEQYPDYTIESTGHSLGGSLTYISYIALAQ

NFPGKTIISNALAAYPIGNEAFANFGASQNGTLNRGNNADDGVPNMYVMWPWDFVHYGTEYYSSGTQASTVKCSGER

DTSCSAGNGQVGVTAGHFSNFGIAMGMAGC
                                                         >SEQ ID NO: 6
APASNDATIADVSSTFTLPPIIKDRVAFSNDIADTDYFNLTKRASETVGGNTMDLPSNAPALPAVPKAGDVVIATAA

QIAEYKKYAALASTAYCRSVVPLNLWTCVNCLRFAPDGKLIKTFSSVISDTNGFVLRSDAQKTIYVVFRGTNSIRSA

ITDLVFTLISYPPVSGARVHTGFYASYQAVVSDYFPVVQSQLTSYPSYKVVVTGHSLGGAHALLAGMDLYQREKRLT
```

ASNLFIHTAGCPRVGNPTFANYVASTGITFTRSVNQRDIVPHVPPTYAGYLHPGVEVWARTSSTVQICTSNTESNMC
SNSIEPFTSFTDHLSYYGITEGVCI

>SEQ ID NO: 7
SPVQLARRAISSELLERFTLFSQFATLSACDQNINHTGQSLTCDYGTCGLVAADNTTVINAFHSDNGPTGYIALDHT
RQLIVLTFRGTVSKSDGDTDLDIVLTSIDDVCTGCKAHHGFWVYWSAVASQATTQLQDATSAYPSYRLSVVGHSLGG
GIAALAGTVLRTQGFTLDIWTFGGPKPGNLKLAEFITNQQPPNSIYRATHTTDPIPKVPLNLPFLDWSQPSPEYWIT
QETGVQVTTDGVEYIEGINSKAGNAGSDRDLRWPNPEHGWYFGNMSVCASPSDASS

>SEQ ID NO: 8
APSQLVPRAVSSGTLDQLTLFAQYSAASYCANNVNSPGDAITCSGGYCPKLQSAGVKSLFEFDDSTEFGDVAGFLSV
DTANKLLVLSFRGSRTISNWIANLDFGQADASSLCIGCKAHSGFLKAWTVVSDDVMPPLVSAMAKYPGFRLVLTGHS
FGGAVAALGATALRKAGYKLDLYTYGQPRVGNTALATYMTNQGSMYRVTHSNDIVPKLPPPLLGYTHASPEYWITSG
DNVAVTTKDITQVNGIGSKDGNAGSNGDSIPAHNWYIVNIDGCK

>SEQ ID NO: 9
APQKRSVSSTVLAQLSRYAQWSAAAYCSGNTSGANQVVSCSANNCPDVQASGATMLYEFDSTNTYGDAAGFLAADTT
QQQIILSFRGSRTTSNWIANLDTELTSSTLCSGCEVHQGFWLDYQTVAATLKAQIDAALNTYPGYSLVVTGHSLGGA
LAMLAGLDLNSQGYAPTIYTYGQPRVGNLALAQYITNVGNQWRVTHADDAVPKLPPRLFGFSHASPEYWITSGDNVA
VTTGDVTVVTGVNSLGGNDGTLTASVSAHNWYLVDIDACK

>SEQ ID NO: 10
APALPLEVRDSGVSQAVYDDLVVYAKYSSAVYQPFCPRPLGSWMIKAFDTKGTQGFVARDDARKEIIVAFRGSFEIV
DILIDIQIILTPLSTPGVSNVGSARVHTGFQKAYNFVIDEVQSLMKSQIDAYPSYKLVVTGHSLGGAVATFAALALK
SKYPSKSLRLFTYGAPRVGDAAFASLVESRLGINNIYRGVHTWDGVPTLLGRWLGYRHYGTEYWQHKDPSKPENVRK
CNGGEDTSCSNSIISTGINPPHAFQFGQVMAINPLLCF

>SEQ ID NO: 11
MVSFGARIKDFFSVLLFGAASTSSSTKTALVSQGFYDAALDFSHLSNIAYCVNAPITPLKSDFSCGQSCVHFPDIEL
VHIFGGDFFSTSITGYLALDHVKKEKYVVFRGTFSIADAITDIQFQQSSFLVNVPALNTFTANDTAPEAQIDCKQCK
IHDGFSKAFTETWHNIGDLLEQHLDSYPDYQLYVTGHSLGAAMALLGATSIKLRGYDPILINYGQPRVGNKAFADYI
SALWFGNGDGLEINQQRRLYRMTHWNDVFVGLPNWDGYTHSNGEVYIKGKYVNPPLKDVFSCAGGENSKCYRSEFNL
LAQINLLQNHLCYIDYIGFCALNVGRRELNDLPHYNGPYKYGHKTEEQFIAEGLELSN

>SEQ ID NO: 12
ATGGTTTTGTCTACTGTTATTGGTGAATGGTTCTCTAGAGTTTTGTTTGGTACTGTTGCTCCATCTCCTTTGACTGC
TACTGCTCCAATCTCTCAAGATTTCTACGATACTGCTTTGACTTTTTCTCATTTGTCTAACGTTGCTTACTGTATCA
ACACTCCATTGGAATCTTTGAAGTCTGATTTCTCTTGTGGTGTTGCTTGTTCTCACTTTCCTAACATGGAGTTGGTT
GAAGAGTTCGGTGGTGAATTTTTCGAGACTTCTATTACTGGTTTCTTGTCTATCGATCATGTTAAGAAAGAGAAGTA
CGTTGTTTACAGAGGTACTTACGATATCGGAGATGTTTACACTGATATCCAATTGTCTCAATCTCCATTCTTGGTTA
CTCCTTCTGCTTTGGGTTCTACTGCTAATTTGTGTGAAGGTTGTACTATTCACGATGGTTGGAACAAGGCTTATAAT
GAGACTATGGGTATTATTGGAGATAAATTGGCTGATCATGTTAACTCTAATCCTGATTACAGATTGGTTGTTACTGG
TCACTCTTTGGGTGCTGCTATTGCTGTTTTGTCTGCTACTTCTTTGAAGGTTAACGGTCAAGATCCATACTTGTATA
CTTACGGTCAACCTAGAATCGGTAACGCTAACTTCGCTAACTTCGTTTCTAAGCAATGGTTTGGTGAAGGAGATGGT
TTGTCTATGGATTCTGATAGAAGATACTTCAGATTGACTCATTGGAACGATTGTTTGTTGGTTTCCCAGCTTTTAA
GGATTACGTTCACTCTGTTGGTGAAATCTACATCGATTACTTCACTGTTCAACCACCTTTGAACAAGGTTTTCTCTT

-continued

GTGCTGGTCCTGAGTCTATGTCTTGTTACAGAAAGGATTTCAACGCTTTGGCTAGATTGGATATCGTTAAAATCAT

TTGGCTTACTTCGATTGGATTTCTTTGTGTACTTTGAACATTGGTAGAAGAGATTTGGAAAGAGGTAGAAAGTTTGA

GGGTACTTGGTTGTATGGTGGTTTGGCTAATGGTTCTACTATTTTC

>SEQ ID NO: 13
GCTGTTTTGCAAAAGAGAGTTTACACTTCTACTGAAACTTCTCATATCGATCAAGAATCTTACAACTTTTTCGAGAA

GTATGCTAGATTGGCTAATATTGGTTATTGTGTTGGTCCAGGTACTAAGATTTTTAAGCCTTTCAACTGTGGTTTGC

AATGTGCTCATTTCCCAAACGTTGAATTGATCGAAGAGTTTCACGATCCTAGATTGATTTTCGATGTTTCTGGTTAC

TTGGCTGTTGATCATGCTTCTAAGCAAATCTACTTGGTTATTAGAGGTACTCACTCTTTGGAGGATGTTATCACTGA

TATCAGAATCATGCAAGCTCCATTGACTAACTTTGATTTGGCTGCTAATATTTCTTCTACTGCTACTTGTGATGATT

GTTTGGTTCACAACGGTTTCATTCAATCTTACAACAACACTTACAATCAAATTGGTCCAAAGTTGGATTCTGTTATT

GAGCAATACCCTGATTATCAAATTGCTGTTACTGGTCATTCTTTGGGTGGTGCTGCTGCTTTGTTGTTCGGTATTAA

CTTGAAGGTTAATGATCACGATCCATTGGTTGTTACTTTGGGTCAACCTATTGTTGGTAACGCTGGTTTCGCTAATT

GGGTTGATAAGTTGTTTTTCGGTCAAGAAAACCCAGATGTTTCTAAGGTTTCTAAGGATAGAAAGTTGTACAGAATC

ACTCATAGAGGAGATATTGTTCCACAAGTTCCTTTTTGGGATGGTTATCAACATTGTTCTGGAGAGGTTTTCATTGA

TTGGCCTTTGATTCACCCACCTTTGTCTAATGTTGTTATGTGTCAAGGTCAATCTAACAAACAATGTTCTGCTGGTA

ACACTTTGTTGCAACAAGTTAACGTTATTGGTAATCACTTGCAATACTTCGTTACTGAAGGTGTTTGTGGTATT

>SEQ ID NO: 14
CAAACTGCTCCAATCACTCAAGAAACTTACGATTTCGTTTTGAAGTACGGTTGGTTGTCTAACGTTGCTTACTGTGT

TAGAGCTCCAGGTCCTTTTGCTTTGCAATCTGATTTCACTTGTGGTAACTCTTGTGCTCATTTCCCTGATGTTACTT

TGGATTACCAATTCGGTGGTAACTTTTTCTCTACTTCTGTTACTGGTTTCTTGGCTCACGATCACACTAAGAAAGAA

AAGTACATCGTTTTTAGAGGTACTTTCTCTATCGCTGATGCTATTACTGATATCCAAACTATCCAACAACCATACAT

GACTTCTATTCCACCTTTGAACACTACTGATATCAACTCTACTAATCCATCTGCTTCTATTAATTGTCCTGGTTGTC

AAGTTCACGATGGTTTTCAAAAAGCTTACAGAGAGACTATGGTTAACGTTCAAGATAGATTGGTTGATTTCTTGGGT

AACAACACTGATTACAAGTTGATCGTTACTGGTCACTCTTTGGGTGCTGTTACTGCTTTGTTTATGGGTATTAACTT

GAAAAATTTGGGTTACGATCCAACTTTGATTAACTATGGTCAACCTAGATTGGGTAATAAGGCTTTCGCTGATTACG

TTGATGCTTTGTTTTTCAAACAAGGAGATGATGGTTTGACTATTAACCCAGAAAGAAGAATGTACAGAGTTACTCAT

TGGAACGATTTCTTTGTTGGTTGGCCTGCTGGTTACTCTCACACTTTGGGTGAAGTTTATATTTCTGACCCAACTGG

TATTAACGCTCCTATTGAAGATGTTTACTCTTGTGCTGGTCCAGAGAACAATCAATGTCATCACGGTTCTTTTAATT

TGTTGGAAAGATTGAACATCTTGAAGAATCATTGTGGTTACTTGAACTGGATTTTCTATTGTGCTATTAATGTTGAT

AAGAGAGAAATGATGATTGATCCACCTAGAGTTGGTAAAAGAGTTGAGCACTGGTCTGGTAAATTTTCTGATGTTGA

ATCTACTGAGGGTTTGATGTACGAGGCTATCTACCCTATG

>SEQ ID NO: 15
GCTCCAGCTCCTGCTCCAATGCAAAGAAGAGATATCTCTTCTACTGTTTTGGATAACATCGATTTGTTCGCTCAATA

CTCTGCTGCTGCTTATTGTTCTTCTAACATTGAATCTACTGGTACTACTTTGACTTGTGATGTTGGTAATTGTCCTT

TGGTTGAAGCTGCTGGTGCTACTACTATCGATGAGTTCGATGATTCTTCTTCTTACGGAGATCCTACTGGTTTCATT

GCTGTTGATCCAACTAACGAGTTGATTGTTTTGTCTTTTAGAGGTTCTTCTGATTTGTCTAATTGGATTGCTGATTT

GGATTTCGGTTTGACTTCTGTTTCTTCTATTTGTGATGGTTGTGAAATGCATAAGGGTTTTTACGAAGCTTGGGAGG

TTATTGCTGATACTATCACTTCTAAGGTTGAGGCTGCTGTTTCTTCTTACCCTGATTATACTTTGGTTTTCACTGGT

CACTCTTATGGTGCTGCTTTGGCTGCTGTTGCTGCTACTGTTTTGAGAAATGCTGGTTACACTTTGGATTTGTATAA

-continued

CTTTGGTCAACCAAGAATTGGTAATTTGGCTTTGGCTGATTACATCACTGATCAAAACATGGGTTCTAACTACAGAG

TTACTCATACTGATGATATTGTTCCTAAGTTGCCACCTGAATTGTTGGGTTACCATCACTTTTCTCCAGAGTATTGG

ATTACTTCTGGTAACGATGTTACTGTTACTACTTCTGATGTTACTGAAGTTGTTGGTGTTGATTCTACTGCTGGTAA

TGATGGTACTTTGTTGGATTCTACTACTGCTCACAGATGGTACACTATCTACATTTCTGAGTGTTCT

>SEQ ID NO: 16

GTTCCAATGTTGCAATCTAGAGCTACTTCTGATCCTGCTGAATGGACTGAGTTGCATAGAGCTGCTCAATTGTCTTC

TGCTGCTTACACTGGTTGTACTGGTTCTGCTTTCGATGTTACTATCACTAAGCAAATTAACGAATTGGTTACTGATA

CTCAAGGTTTCATTGGTTACTCTACTGAGAAGAAAAGAATCACTGTTGCTATGAGAGGTTCTACTTCTGCTACTGAT

ATTGCTAACGATGTTGATACTACTTTGGTTGAACCAACTTTGTCTGGTGTTAATTTTCCTTCTGGTGCTAAGATGAT

GCATGGTATCTACTCTCCATGGTCTTCTGTTCACGATGATGTTATCTCTGAGGTTAAGTCTTTGGTTGAGCAATACC

CTGATTATACTATTGAATCTACTGGTCACTCTTTGGGTGGTTCTTTGACTTACATCTCTTACATCGCTTTGGCTCAA

AACTTCCCAGGTAAAACTATCATCTCTAACGCTTTGGCTGCTTATCCTATTGGTAACGAGGCTTTTGCTAATTTCGG

TGCTTCTCAAAACGGTACTTTGAATCGTGGTAACAATGCTGATGATGGTGTTCCAAATATGTACGTTATGTGGCCTT

GGGATTTCGTTCATTACGGTACTGAATACTACTCTTCTGGTACTCAAGCTTCTACTGTTAAATGTTCTGGAGAGAGA

GATACTTCTTGTTCTGCTGGTAACGGTCAAGTTGGTGTTACTGCTGGTCACTTTTCTAATTTCGGTATTGCTATGGG

TATGGCTGGTTGT

>SEQ ID NO: 17

GCTCCTGCTTCTAATGATGCTACTATTGCTGATGTTTCTTCTACTTTCACTTTGCCACCTATTATTAAGGATAGAGT

TGCTTTTTCTAACGATATCGCTGATACTGATTACTTCAACTTGACTAAGAGAGCTTCTGAAACTGTTGGTGGTAATA

CTATGGATTTGCCATCTAACGCTCCAGCTTTGCCTGCTGTTCCAAAGGCTGGAGATGTTGTTATTGCTACTGCTGCT

CAAATTGCTGAGTACAAGAAATATGCTGCTTTGGCTTCTACTGCTTACTGTAGATCTGTTGTTCCTTTGAATTTGTG

GACTTGTGTTAACTGTTTGAGATTTGCTCCAGATGGTAAATTGATTAAAACTTTCTCTTCTGTTATTTCTGATACTA

ACGGTTTCGTTTTGAGATCTGATGCTCAAAAGACTATCTACGTTGTTTTCAGAGGTACTAACTCTATCAGATCTGCT

ATCACTGATTTGGTTTTTACTTTGATCTCTTACCCACCTGTTTCTGGTGCTAGAGTTCATACTGGTTTCTACGCTTC

TTATCAAGCTGTTGTTTCTGATTACTTTCCTGTTGTTCAATCTCAATTGACTTCTTACCCATCTTATAAGGTTGTTG

TTACTGGTCATTCTTTGGGTGGTGCTCACGCTTTGTTGGCTGGTATGGATTTGTACCAAAGAGAAAAGAGATTGACT

GCTTCTAATTTGTTTATTCACACTGCTGGTTGTCCTAGAGTTGGTAATCCAACTTTCGCTAACTACGTTGCTTCTAC

TGGTATCACTTTTACTAGATCTGTTAACCAAAGAGATATTGTTCCTCATGTTCCACCTACTTACGCTGGTTATTTGC

ACCCAGGTGTTGAAGTTTGGGCTAGAACTTCTTCTACTGTTCAAATCTGTACTTCTAACACTGAATCTAACATGTGT

TCTAACTCTATCGAGCCTTTTACTTCTTTCACTGATCATTTGTCTTACTATGGTATTACTGAGGGTGTTTGTATT

>SEQ ID NO: 18

TCTCCAGTTCAATTGGCTAGAAGAGCTATTTCTTCTGAATTGTTGGAGAGATTCACTTTGTTCTCTCAATTTGCTAC

TTTGTCTGCTTGTGATCAAAACATCAACCATACTGGTCAATCTTTGACTTGTGATTACGGTACTTGTGGTTTGGTTG

CTGCTGATAACACTACTGTTATTAATGCTTTCCATTCTGATAACGGTCCTACTGGTTATATTGCTTTGGATCACACT

AGACAATTGATCGTTTTGACTTTTAGAGGTACTGTTTCTAAGTCTGATGGAGATACTGATTTGGATATCGTTTTGAC

TTCTATCGATGATGTTTGTACTGGTTGTAAAGCTCATCACGGTTTCTGGGTTTACTGGTCTGCTGTTGCTTCTCAAG

CTACTACTCAATTGCAAGATGCTACTTCTGCTTACCCATCTTATAGATTGTCTGTTGTTGGTCATTCTTTGGGTGGT

GGTATTGCTGCTTTGGCTGGTACTGTTTTGAGAACTCAAGGTTTCACTTTGGATATTTGGACTTTTGGTGGTCCAAA

GCCTGGTAACTTGAAGTTGGCTGAATTCATTACTAACCAACAACCACCTAATTCTATCTACAGAGCTACTCACACTA

CTGATCCAATTCCTAAGGTTCCATTGAATTTGCCATTTTTGGATTGGTCTCAACCATCTCCTGAATACTGGATTACT

-continued
CAAGAGACTGGTGTTCAAGTTACTACTGATGGTGTTGAATACATCGAGGGTATTAACTCTAAAGCTGGTAATGCTGG
TTCTGATAGAGATTTGAGATGGCCAAACCCTGAGCACGGTTGGTATTTTGGTAATATGTCTGTTTGTGCTTCTCCTT
CTGATGCTTCTTCT >SEQ ID NO: 19
GCTCCTTCTCAATTGGTTCCAAGAGCTGTTTCTTCTGGTACTTTGGATCAATTGACTTTGTTTGCTCAATACTCTGC
TGCTTCTTATTGTGCTAACAATGTTAACTCTCCTGGAGATGCTATTACTTGTTCTGGTGGTTACTGTCCAAAGTTGC
AATCTGCTGGTGTTAAGTCTTTGTTCGAATTCGATGATTCTACTGAGTTTGGAGATGTTGCTGGTTTCTTGTCTGTT
GATACTGCTAATAAGTTGTTGGTTTTGTCTTTTAGAGGTTCTAGAACTATCTCTAACTGGATCGCTAATTTGGATTT
CGGTCAAGCTGATGCTTCTTCTTTGTGTATTGGTTGTAAGGCTCATTCTGGTTTCTTGAAAGCTTGGACTGTTGTTT
CTGATGATGTTATGCCACCTTTGGTTTCTGCTATGGCTAAATACCCTGGTTTTAGATTGGTTTTGACTGGTCACTCT
TTCGGTGGTGCTGTTGCTGCTTTGGGTGCTACTGCTTTGAGAAAGGCTGGTTACAAGTTGGATTTGTACACTTACGG
TCAACCAAGAGTTGGTAACACTGCTTTGGCTACTTACATGACTAATCAAGGTTCTATGTACAGAGTTACTCATTCTA
ACGATATCGTTCCTAAGTTGCCACCTCCATTGTTGGGTTACACTCACGCTTCTCCAGAATATTGGATTACTTCTGGA
GATAACGTTGCTGTTACTACTAAGGATATCACTCAAGTTAACGGTATCGGTTCTAAAGATGGTAACGCTGGTTCTAA
TGGAGATTCTATTCCTGCTCATAACTGGTATATTGTTAATATTGATGGTTGTAAA >SEQ ID NO: 20
GCTCCACAAAAGAGATCTGTTTCTTCTACTGTTTTGGCTCAATTGTCTAGATACGCTCAATGGTCTGCTGCTGCTTA
TTGTTCTGGTAACACTTCTGGTGCTAATCAAGTTGTTTCTTGTTCTGCTAACAATTGTCCTGATGTTCAAGCTTCTG
GTGCTACTATGTTGTACGAATTCGATTCTACTAACACTTACGGAGATGCTGCTGGTTTCTTGGCTGCTGATACTACT
CAACAACAAATCATCTTGTCTTTTAGAGGTTCTAGAACTACTTCTAACTGGATTGCTAATTTGGATACTGAATTGAC
TTCTTCTACTTTGTGTTCTGGTTGTGAGGTTCATCAAGGTTTCTGGTTGGATTACCAAACTGTTGCTGCTACTTTGA
AAGCTCAAATTGATGCTGCTTTGAATACTTACCCAGGTTATTCTTTGGTTGTTACTGGTCACTCTTTGGGTGGTGCT
TTGGCTATGTTGGCTGGTTTGGATTTGAACTCTCAAGGTTACGCTCCAACTATCTACACTTATGGTCAACCTAGAGT
TGGTAATTTGGCTTTGGCTCAATACATCACTAACGTTGGTAACCAATGGAGAGTTACTCATGCTGATGATGCTGTTC
CAAAGTTGCCACCTAGATTGTTTGGTTTCTCTCACGCTTCTCCTGAGTACTGGATTACTTCTGGAGATAACGTTGCT
GTTACTACTGGAGATGTTACTGTTGTTACTGGTGTTAACTCTTTGGGTGGTAATGATGGTACTTTGACTGCTTCTGT
TTCTGCTCATAACTGGTATTTGGTTGATATCGATGCTTGTAAA >SEQ ID NO: 21
GCTCCAGCTTTGCCTTTGGAAGTTAGAGATTCTGGTGTTTCTCAAGCTGTTTACGATGATTTGGTTGTTTACGCTAA
GTATTCTTCTGCTGTTTATCAACCATTTTGTCCAAGACCTTTGGGTTCTTGGATGATTAAGGCTTTTGATACTAAAG
GTACTCAAGGTTTCGTTGCTAGAGATGATGCTAGAAAGGAAATCATCGTTGCTTTTAGAGGTTCTTTCGAGATTGTT
GATATCTTGATCGATATCCAAATCATCTTGACTCCATTGTCTACTCCTGGTGTTTCTAACGTTGGTTCTGCTAGAGT
TCATACTGGTTTCCAAAAGGCTTACAACTTCGTTATCGATGAGGTTCAATCTTTGATGAAGTCTCAAATCGATGCTT
ACCCTTCTTACAAGTTGGTTGTTACTGGTCACTCTTTGGGTGGTGCTGTTGCTACTTTCGCTGCTTTGGCTTTGAAG
TCTAAGTACCCATCTAAGTCTTTGAGATTGTTTACTTACGGTGCTCCAGAGTTGGAGATGCTGCTTTCGCTTCTTT
GGTTGAATCTAGATTGGGTATTAACAACATCTACAGAGGTGTTCATACTTGGGATGGTGTTCCAACTTTGTTGGGTA
GATGGTTGGGTTACAGACATTATGGTACTGAGTATTGGCAACACAAGGATCCATCTAAACCTGAAAACGTTAGAAAG
TGTAATGGTGGAGAGGATACTTCTTGTTCTAACTCTATCATCTCTACTGGTATTAATCCACCTCACGCTTTTCAATT
CGGTCAAGTTATGGCTATTAACCCTTTGTTGTGTTTT >SEQ ID NO: 22
ATGGTTTCTTTCGGTGCTAGAATTAAGGATTTCTTTTCTGTTTTGTTGTTTGGTGCTGCTTCTACTTCTTCTTCTAC
TAAAACTGCTTTGGTTTCTCAAGGTTTTTATGATGCTGCTTTGGATTTCTCTCATTTGTCTAACATCGCTTACTGTG
TTAACGCTCCAATTACTCCTTTGAAGTCTGATTTTTCTTGTGGTCAATCTTGTGTTCATTTCCCAGATATTGAATTG

```
GTTCACATTTTTGGTGGAGATTTCTTTTCTACTTCTATCACTGGTTATTTGGCTTTGGATCACGTTAAGAAAGAGAA
GTACGTTGTTTTTAGAGGTACTTTCTCTATCGCTGATGCTATCACTGATATCCAATTCCAACAATCTTCTTTCTTGG
TTAACGTTCCAGCTTTGAATACTTTCACTGCTAACGATACTGCTCCTGAAGCTCAAATCGATTGTAAGCAGTGTAAG
ATTCACGATGGTTTTTCTAAGGCTTTCACTGAAACTTGGCATAACATTGGAGATTTGTTGGAGCAACACTTGGATTC
TTACCCAGATTATCAATTGTACGTTACTGGTCACTCTTTGGGTGCTGCTATGGCTTTGTTGGGTGCTACTTCTATTA
AGTTGAGAGGTTACGATCCAATCTTGATTAATTACGGTCAACCTAGAGTTGGTAACAAAGCTTTCGCTGATTATATT
TCTGCTTTGTGGTTTGGTAATGGAGATGGTTTGGAAATTAACCAACAAAGAAGATTGTACAGAATGACTCATTGGAA
CGATGTTTTCGTTGGTTTGCCTAACTGGGATGGTTACACTCACTCTAACGGAGAGGTTTACATCAAGGGTAAATACG
TTAACCCACCTTTGAAGGATGTTTTCTCTTGTGCTGGTGGTGAAAACTCTAAGTGTTACAGATCTGAGTTTAATTTG
TTGGCTCAAATTAACTTGTTGCAAAACCATTTGTGTTACATCGATTACATCGGTTTCTGTCTTTGAACGTTGGTAG
AAGAGAGTTGAATGATTTGCCACATTACAACGGTCCTTACAAGTATGGTCACAAAACTGAAGAGCAATTCATTGCTG
AAGGTTTGGAGTTGTCTAAT
                                                                      >SEQ ID NO: 23
ATGGTCCTGTCCACTGTTATCGGAGAATGGTTTTCAAGAGTTTTGTTTGGTACTGTCGCCCCATCACCACTCACCGC
CACAGCCCCCATTTCTCAGGACTTCTACGATACCGCTCTCACGTTCTCTCACCTATCTAATGTTGCTTACTGTATCA
ACACCCCTCTTGAGTCCCTCAAGTCCGACTTTTCCTGCGGTGTCGCATGTTCTCACTTCCCAAACATGGAACTTGTT
GAAGAGTTCGGTGGAGAATTTTTCGAAACTTCTATTACTGGTTTTCTATCTATCGACCATGTCAAAAAGGAAAAGTA
CGTTGTGTACAGAGGCACCTATGACATTGGTGACGTTTATACTGACATTCAATTAAGCCAATCCCCATTCTTGGTTA
CCCCTTCTGCCCTGGGTTCTACAGCAAATCTGTGTGAGGGTTGTACTATCCACGATGGTTGGAACAAAGCATACAAC
GAAACCATGGGTATTATCGGAGACAAGCTCGCTGACCACGTTAACTCCAACCCAGATTACAGATTGGTCGTAACTGG
ACATTCACTTGGTGCTGCTATTGCTGTACTATCTGCAACCTCTCTTAAGGTCAATGGCCAAGATCCTTACCTTTACA
CTTACGGTCAGCCTCGTATTGGTAATGCTAACTTCGCAAACTTTGTGAGTAAGCAATGGTTCGGTGAGGGTGACGGT
CTATCTATGGACTCGGACAGACGTTATTTCAGACTGACTCACTGGAACGACCTCTTTGTTGGTTTCCCTGCTTTCAA
GGACTACGTGCACTCTGTCGGAGAGATTTACATAGACTATTTCACCGTTCAACCACCACTCAACAAAGTTTTCTCTT
GTGCTGGGCCTGAGTCTATGTCCTGTTACAGAAAGGACTTCAACGCCCTTGCTAGACTTGATATTGTGAAAAACCAC
CTAGCTTACTTCGATTGGATCTCTCTGTGCACCCTAAACATCGGCAGACGTGATCTGGAGAGGGGTAGAAAGTTCGA
GGGTACTTGGCTCTACGGTGGACTGGCTAACGGATCCACTATCTTC
```

---

The invention claimed is:

1. A method for preparing a dairy product, comprising adding to a raw material or intermediate product of the dairy product a lipase or a host cell transformed to express a DNA sequence encoding a lipase, wherein the lipase
comprises an amino acid sequence having at least 95% sequence identity to the amino acid sequence of SEQ ID NO: 1 or SEQ ID NO: 3, and wherein the lipase has a higher specificity towards release of $C_4$-fatty acids as compared to release of one or more of $C_{10}$-fatty acids, $C_8$-fatty acids, $C_6$-fatty acids, $C_{12}$-fatty acids, $C_{18:2}$-fatty acids, $C_{14}$-fatty acids, $C_{18:0}$-fatty acids, $C_{18:1}$-fatty acids, C-fatty acids-$C_{18:2}$-fatty acids, $C_{10}$-fatty acids-$C_{18:1}$-fatty acids, $C_{12}$-fatty acids-$C_{18:0}$-fatty acids, $C_{14}$-fatty acids-$C_{16:0}$-fatty acids, and $C_{16}$-fatty acids-$C_{18}$-fatty acids, when assessed in a dairy composition comprising milk fat.

2. The method of claim 1, wherein the DNA sequence encoding the lipase is selected from isolated DNA sequences, recombinant DNA sequences, and synthetic DNA sequences.

3. The method of claim 1, wherein the DNA sequence encoding the lipase further comprises a nucleotide sequence encoding a signal peptide.

4. The method of claim 1, wherein the lipase has a higher specificity towards release of $C_4$-fatty acids as compared to release of one or more of $C_{10}$-fatty acids, $C_6$-fatty acids, $C_8$-fatty acids, $C_{12}$-fatty acids, $C_{14}$-fatty acids, $C_{16}$-fatty acids, $C_{18:1}$-fatty acids, $C_{18:2}$-fatty acids, $C_{18:3}$-fatty acids, and $C_{16}$-$C_{18}$-fatty acids, when assessed in a dairy composition comprising milk fat at a pH selected from a pH below 7, a pH of 6.6-6.8, a pH below 6, a pH of 3.8-5.6, a pH of 4.4-5.4, and a pH of 4.6-5.2.

5. The method of claim 1, wherein the lipase has a higher specificity towards release of $C_4$-fatty acids as compared to release of one or more of $C_{10}$-fatty acids, $C_6$-fatty acids, $C_8$-fatty acids, $C_{12}$-fatty acids, $C_{14}$-fatty acids, $C_{16}$-fatty acids, $C_{18:1}$-fatty acids, $C_{18:2}$-fatty acids, $C_{18:3}$-fatty acids, and $C_{16}$-$C_{18}$-fatty acids, when assessed in a dairy composition comprising milk fat at a selected from a temperature below 20° C., a temperature below 15° C., a temperature below 10° C., and a temperature of 5-8° C.

6. The method of claim 1, wherein the dairy product obtained by the method has one or more fatty acid profiles selected from:
(a) comprising more $C_4$-fatty acids than one or more other fatty acids selected from $C_6$-fatty acids, $C_8$-fatty acids, C10-fatty acids, C12-fatty acids, C14-fatty acids, C16-fatty acids, C18:1-fatty acids, C18:2-fatty acids and C18:3-fatty acids, and
(b) comprising more $C_6$-fatty acids than one or more other fatty acids selected from $C_8$-fatty acids, $C_{10}$-fatty acids, $C_{12}$-fatty acids, $C_{14}$-fatty acids, $C_{16}$-fatty acids, $C_{18:1}$-fatty acids, $C_{18:2}$-fatty acids and $C_{18:3}$-fatty acids.

7. The method of claim 1, wherein the dairy product has one or more flavor profiles selected from reduced soapiness and increased butyric flavors, as compared to a dairy product made without the lipase and without the host cell transformed to express a DNA sequence encoding the lipase.

8. The method of claim 1, wherein the lipase is a microbial lipase selected from an isolated microbial lipase, a recombinant microbial lipase, and a synthetic microbial lipase.

9. The method of claim 1, wherein the dairy product is selected from a cheese, a processed cheese, a cheese-like product, an enzyme-modified cheese, a butter, a yogurt, a cream, and a seasoning.

10. The method of claim 1, wherein the dairy product is a cheese selected from Feta cheese, Provolone cheese, Pecorino cheese, Parmesan cheese, Grana Padano cheese, Parmigiano Reggiano cheese, Romano cheese, Chester cheese, Danbo cheese, Manchego cheese, Saint Paulin cheese, Cheddar cheese, Monterey cheese, Colby cheese, Edam cheese, Gouda cheese, Muenster cheese, Swiss-type cheese, Gruyere cheese, Emmental cheese; Mozzarella cheese, Queso fresco cheese, Ricotta cheese, Cream cheese, Neufchatel cheese, Cottage cheese, Brie, Camembert, Gorgonzola and Danish blue cheese.

\* \* \* \* \*

SEQUENCE LISTING

<160> NUMBER OF SEQ ID NOS: 23

<210> SEQ ID NO 1
<211> LENGTH: 349
<212> TYPE: PRT
<213> ORGANISM: Yarrowia lipolytica
<223> OTHER INFORMATION: ">SEQ ID NO: 1"
<223> OTHER INFORMATION: >SEQ ID NO: 1
<220> FEATURE:
<223> OTHER INFORMATION: >SEQ ID NO: 1
<220> FEATURE:
<223> OTHER INFORMATION: >SEQ ID NO: 1

<400> SEQUENCE: 1

Met Val Leu Ser Thr Val Ile Gly Glu Trp Phe Ser Arg Val Leu Phe
1               5                   10                  15

Gly Thr Val Ala Pro Ser Pro Leu Thr Ala Thr Ala Pro Ile Ser Gln
            20                  25                  30

Asp Phe Tyr Asp Thr Ala Leu Thr Phe Ser His Leu Ser Asn Val Ala
            35                  40                  45

Tyr Cys Ile Asn Thr Pro Leu Glu Ser Leu Lys Ser Asp Phe Ser Cys
 50                  55                  60

Gly Val Ala Cys Ser His Phe Pro Asn Met Glu Leu Val Glu Glu Phe
 65                  70                  75                  80

Gly Gly Glu Phe Phe Glu Thr Ser Ile Thr Gly Phe Leu Ser Ile Asp
                85                  90                  95

His Val Lys Lys Glu Lys Tyr Val Val Tyr Arg Gly Tyr Asp Ile
            100                 105                 110

Gly Asp Val Tyr Thr Asp Ile Gln Leu Ser Gln Ser Pro Phe Leu Val
            115                 120                 125

Thr Pro Ser Ala Leu Gly Ser Thr Ala Asn Leu Cys Glu Gly Cys Thr
130                 135                 140

Ile His Asp Gly Trp Asn Lys Ala Tyr Asn Glu Thr Met Gly Ile Ile
145                 150                 155                 160

Gly Asp Lys Leu Ala Asp His Val Asn Ser Asn Pro Asp Tyr Arg Leu
            165                 170                 175

Val Val Thr Gly His Ser Leu Gly Ala Ala Ile Ala Val Leu Ser Ala
            180                 185                 190

Thr Ser Leu Lys Val Asn Gly Gln Asp Pro Tyr Leu Tyr Thr Tyr Gly
            195                 200                 205

Gln Pro Arg Ile Gly Asn Ala Asn Phe Ala Asn Phe Val Ser Lys Gln
            210                 215                 220

Trp Phe Gly Glu Gly Asp Gly Leu Ser Met Asp Ser Asp Arg Arg Tyr
225                 230                 235                 240

Phe Arg Leu Thr His Trp Asn Asp Leu Phe Val Gly Phe Pro Ala Phe
            245                 250                 255

Lys Asp Tyr Val His Ser Val Gly Glu Ile Tyr Ile Asp Tyr Phe Thr
            260                 265                 270

Val Gln Pro Pro Leu Asn Lys Val Phe Ser Cys Ala Gly Pro Glu Ser
            275                 280                 285

Met Ser Cys Tyr Arg Lys Asp Phe Asn Ala Leu Ala Arg Leu Asp Ile
290                 295                 300

Val Lys Asn His Leu Ala Tyr Phe Asp Trp Ile Ser Leu Cys Thr Leu
305                 310                 315                 320

Asn Ile Gly Arg Arg Asp Leu Glu Arg Gly Arg Lys Phe Glu Gly Thr
            325                 330                 335

Trp Leu Tyr Gly Gly Leu Ala Asn Gly Ser Thr Ile Phe
            340                 345

<210> SEQ ID NO 2
<211> LENGTH: 307
<212> TYPE: PRT
<213> ORGANISM: Yarrowia lipolytica
<223> OTHER INFORMATION: ">SEQ ID NO: 2"
<223> OTHER INFORMATION: >SEQ ID NO: 2
<220> FEATURE:
<223> OTHER INFORMATION: >SEQ ID NO: 2
<220> FEATURE:
<223> OTHER INFORMATION: >SEQ ID NO: 2

<400> SEQUENCE: 2

Ala Val Leu Gln Lys Arg Val Tyr Thr Ser Thr Glu Thr Ser His Ile
1               5                   10                  15

Asp Gln Glu Ser Tyr Asn Phe Phe Glu Lys Tyr Ala Arg Leu Ala Asn
            20                  25                  30

Ile Gly Tyr Cys Val Gly Pro Gly Thr Lys Ile Phe Lys Pro Phe Asn
            35                  40                  45

Cys Gly Leu Gln Cys Ala His Phe Pro Asn Val Glu Leu Ile Glu Glu
        50                  55                  60

Phe His Asp Pro Arg Leu Ile Phe Asp Val Ser Gly Tyr Leu Ala Val
 65                 70                  75                  80

Asp His Ala Ser Lys Gln Ile Tyr Leu Val Ile Arg Gly Thr His Ser
                85                  90                  95

Leu Glu Asp Val Ile Thr Asp Ile Arg Ile Met Gln Ala Pro Leu Thr
            100                 105                 110

Asn Phe Asp Leu Ala Ala Asn Ile Ser Ser Thr Ala Thr Cys Asp Asp
        115                 120                 125

Cys Leu Val His Asn Gly Phe Ile Gln Ser Tyr Asn Asn Thr Tyr Asn
130                 135                 140

Gln Ile Gly Pro Lys Leu Asp Ser Val Ile Glu Gln Tyr Pro Asp Tyr
145                 150                 155                 160

Gln Ile Ala Val Thr Gly His Ser Leu Gly Gly Ala Ala Ala Leu Leu
                165                 170                 175

Phe Gly Ile Asn Leu Lys Val Asn Asp His Asp Pro Leu Val Val Thr
            180                 185                 190

Leu Gly Gln Pro Ile Val Gly Asn Ala Gly Phe Ala Asn Trp Val Asp
        195                 200                 205

Lys Leu Phe Phe Gly Gln Glu Asn Pro Asp Val Ser Lys Val Ser Lys
        210                 215                 220

Asp Arg Lys Leu Tyr Arg Ile Thr His Arg Gly Asp Ile Val Pro Gln
225                 230                 235                 240

Val Pro Phe Trp Asp Gly Tyr Gln His Cys Ser Gly Glu Val Phe Ile
                245                 250                 255

Asp Trp Pro Leu Ile His Pro Pro Leu Ser Asn Val Val Met Cys Gln
            260                 265                 270

Gly Gln Ser Asn Lys Gln Cys Ser Ala Gly Asn Thr Leu Leu Gln Gln
        275                 280                 285

Val Asn Val Ile Gly Asn His Leu Gln Tyr Phe Val Thr Glu Gly Val
        290                 295                 300

Cys Gly Ile
305

<210> SEQ ID NO 3
<211> LENGTH: 347
<212> TYPE: PRT
<213> ORGANISM: Yarrowia lipolytica
<223> OTHER INFORMATION: "> SEQ ID NO: 3"
<223> OTHER INFORMATION: > SEQ ID NO: 3
<220> FEATURE:
<223> OTHER INFORMATION: > SEQ ID NO: 3
<220> FEATURE:
<223> OTHER INFORMATION: > SEQ ID NO: 3

<400> SEQUENCE: 3

Gln Thr Ala Pro Ile Thr Gln Glu Thr Tyr Asp Phe Val Leu Lys Tyr
 1               5                  10                  15

Gly Trp Leu Ser Asn Val Ala Tyr Cys Val Arg Ala Pro Gly Pro Phe
            20                  25                  30

Ala Leu Gln Ser Asp Phe Thr Cys Gly Asn Ser Cys Ala His Phe Pro
        35                  40                  45

Asp Val Thr Leu Asp Tyr Gln Phe Gly Gly Asn Phe Phe Ser Thr Ser

```
                50                  55                  60
Val Thr Gly Phe Leu Ala His Asp His Thr Lys Lys Glu Lys Tyr Ile
 65                  70                  75                  80

Val Phe Arg Gly Thr Phe Ser Ile Ala Asp Ala Ile Thr Asp Ile Gln
                     85                  90                  95

Thr Ile Gln Gln Pro Tyr Met Thr Ser Ile Pro Pro Leu Asn Thr Thr
                100                 105                 110

Asp Ile Asn Ser Thr Asn Pro Ser Ala Ser Ile Asn Cys Pro Gly Cys
                115                 120                 125

Gln Val His Asp Gly Phe Gln Lys Ala Tyr Arg Glu Thr Met Val Asn
            130                 135                 140

Val Gln Asp Arg Leu Val Asp Phe Leu Gly Asn Asn Thr Asp Tyr Lys
145                 150                 155                 160

Leu Ile Val Thr Gly His Ser Leu Gly Ala Val Thr Ala Leu Phe Met
                165                 170                 175

Gly Ile Asn Leu Lys Asn Leu Gly Tyr Asp Pro Thr Leu Ile Asn Tyr
                180                 185                 190

Gly Gln Pro Arg Leu Gly Asn Lys Ala Phe Ala Asp Tyr Val Asp Ala
            195                 200                 205

Leu Phe Phe Lys Gln Gly Asp Asp Gly Leu Thr Ile Asn Pro Glu Arg
210                 215                 220

Arg Met Tyr Arg Val Thr His Trp Asn Asp Phe Phe Val Gly Trp Pro
225                 230                 235                 240

Ala Gly Tyr Ser His Thr Leu Gly Glu Val Tyr Ile Ser Asp Pro Thr
                245                 250                 255

Gly Ile Asn Ala Pro Ile Glu Asp Val Tyr Ser Cys Ala Gly Pro Glu
                260                 265                 270

Asn Asn Gln Cys His His Gly Ser Phe Asn Leu Leu Arg Leu Asn
            275                 280                 285

Ile Leu Lys Asn His Cys Gly Tyr Leu Asn Trp Ile Phe Tyr Cys Ala
290                 295                 300

Ile Asn Val Asp Lys Arg Glu Met Met Ile Asp Pro Pro Arg Val Gly
305                 310                 315                 320

Lys Arg Val Glu His Trp Ser Gly Lys Phe Ser Asp Val Glu Ser Thr
                325                 330                 335

Glu Gly Leu Met Tyr Glu Ala Ile Tyr Pro Met
            340                 345
```

<210> SEQ ID NO 4
<211> LENGTH: 279
<212> TYPE: PRT
<213> ORGANISM: Aspergillus niger
<223> OTHER INFORMATION: "> SEQ ID NO: 4"
<223> OTHER INFORMATION: > SEQ ID NO: 4
<220> FEATURE:
<223> OTHER INFORMATION: > SEQ ID NO: 4
<220> FEATURE:
<223> OTHER INFORMATION: > SEQ ID NO: 4

<400> SEQUENCE: 4

```
Ala Pro Ala Pro Ala Pro Met Gln Arg Arg Asp Ile Ser Ser Thr Val
 1               5                  10                  15

Leu Asp Asn Ile Asp Leu Phe Ala Gln Tyr Ser Ala Ala Ala Tyr Cys
                20                  25                  30

Ser Ser Asn Ile Glu Ser Thr Gly Thr Thr Leu Thr Cys Asp Val Gly
            35                  40                  45
```

-continued

```
Asn Cys Pro Leu Val Glu Ala Gly Ala Thr Thr Ile Asp Glu Phe
 50                  55                  60

Asp Asp Ser Ser Ser Tyr Gly Asp Pro Thr Gly Phe Ile Ala Val Asp
 65                  70                  75                  80

Pro Thr Asn Glu Leu Ile Val Leu Ser Phe Arg Gly Ser Ser Asp Leu
                 85                  90                  95

Ser Asn Trp Ile Ala Asp Leu Asp Phe Gly Leu Thr Ser Val Ser Ser
             100                 105                 110

Ile Cys Asp Gly Cys Glu Met His Lys Gly Phe Tyr Glu Ala Trp Glu
         115                 120                 125

Val Ile Ala Asp Thr Ile Thr Ser Lys Val Glu Ala Ala Val Ser Ser
130                 135                 140

Tyr Pro Asp Tyr Thr Leu Val Phe Thr Gly His Ser Tyr Gly Ala Ala
145                 150                 155                 160

Leu Ala Ala Val Ala Ala Thr Val Leu Arg Asn Ala Gly Tyr Thr Leu
                165                 170                 175

Asp Leu Tyr Asn Phe Gly Gln Pro Arg Ile Gly Asn Leu Ala Leu Ala
            180                 185                 190

Asp Tyr Ile Thr Asp Gln Asn Met Gly Ser Asn Tyr Arg Val Thr His
        195                 200                 205

Thr Asp Asp Ile Val Pro Lys Leu Pro Pro Glu Leu Leu Gly Tyr His
210                 215                 220

His Phe Ser Pro Glu Tyr Trp Ile Thr Ser Gly Asn Asp Val Thr Val
225                 230                 235                 240

Thr Thr Ser Asp Val Thr Glu Val Val Gly Val Asp Ser Thr Ala Gly
                245                 250                 255

Asn Asp Gly Thr Leu Leu Asp Ser Thr Thr Ala His Arg Trp Tyr Thr
            260                 265                 270

Ile Tyr Ile Ser Glu Cys Ser
        275

<210> SEQ ID NO 5
<211> LENGTH: 261
<212> TYPE: PRT
<213> ORGANISM: Aspergillus niger
<223> OTHER INFORMATION: "> SEQ ID NO: 5"
<223> OTHER INFORMATION: > SEQ ID NO: 5
<220> FEATURE:
<223> OTHER INFORMATION: > SEQ ID NO: 5
<220> FEATURE:
<223> OTHER INFORMATION: > SEQ ID NO: 5

<400> SEQUENCE: 5

Val Pro Met Leu Gln Ser Arg Ala Thr Ser Asp Pro Ala Glu Trp Thr
 1               5                  10                  15

Glu Leu His Arg Ala Ala Gln Leu Ser Ser Ala Ala Tyr Thr Gly Cys
             20                  25                  30

Thr Gly Ser Ala Phe Asp Val Thr Ile Thr Lys Gln Ile Asn Glu Leu
         35                  40                  45

Val Thr Asp Thr Gln Gly Phe Ile Gly Tyr Ser Thr Glu Lys Lys Arg
 50                  55                  60

Ile Thr Val Ala Met Arg Gly Ser Thr Ser Ala Thr Asp Ile Ala Asn
 65                  70                  75                  80

Asp Val Asp Thr Thr Leu Val Glu Pro Thr Leu Ser Gly Val Asn Phe
                 85                  90                  95

Pro Ser Gly Ala Lys Met Met His Gly Ile Tyr Ser Pro Trp Ser Ser
            100                 105                 110
```

```
Val His Asp Asp Val Ile Ser Glu Val Lys Ser Leu Val Glu Gln Tyr
            115                 120                 125

Pro Asp Tyr Thr Ile Glu Ser Thr Gly His Ser Leu Gly Gly Ser Leu
        130                 135                 140

Thr Tyr Ile Ser Tyr Ile Ala Leu Ala Gln Asn Phe Pro Gly Lys Thr
145                 150                 155                 160

Ile Ile Ser Asn Ala Leu Ala Ala Tyr Pro Ile Gly Asn Glu Ala Phe
                165                 170                 175

Ala Asn Phe Gly Ala Ser Gln Asn Gly Thr Leu Asn Arg Gly Asn Asn
            180                 185                 190

Ala Asp Asp Gly Val Pro Asn Met Tyr Val Met Trp Pro Trp Asp Phe
        195                 200                 205

Val His Tyr Gly Thr Glu Tyr Tyr Ser Ser Gly Thr Gln Ala Ser Thr
    210                 215                 220

Val Lys Cys Ser Gly Glu Arg Asp Thr Ser Cys Ser Ala Gly Asn Gly
225                 230                 235                 240

Gln Val Gly Val Thr Ala Gly His Phe Ser Asn Phe Gly Ile Ala Met
                245                 250                 255

Gly Met Ala Gly Cys
            260

<210> SEQ ID NO 6
<211> LENGTH: 333
<212> TYPE: PRT
<213> ORGANISM: Mucor javanicus
<223> OTHER INFORMATION: "> SEQ ID NO: 6"
<223> OTHER INFORMATION: > SEQ ID NO: 6
<220> FEATURE:
<223> OTHER INFORMATION: > SEQ ID NO: 6
<220> FEATURE:
<223> OTHER INFORMATION: > SEQ ID NO: 6

<400> SEQUENCE: 6

Ala Pro Ala Ser Asn Asp Ala Thr Ile Ala Asp Val Ser Ser Thr Phe
1               5                   10                  15

Thr Leu Pro Pro Ile Ile Lys Asp Arg Val Ala Phe Ser Asn Asp Ile
            20                  25                  30

Ala Asp Thr Asp Tyr Phe Asn Leu Thr Lys Arg Ala Ser Glu Thr Val
        35                  40                  45

Gly Gly Asn Thr Met Asp Leu Pro Ser Asn Ala Pro Ala Leu Pro Ala
    50                  55                  60

Val Pro Lys Ala Gly Asp Val Val Ile Ala Thr Ala Ala Gln Ile Ala
65                  70                  75                  80

Glu Tyr Lys Lys Tyr Ala Ala Leu Ala Ser Thr Ala Tyr Cys Arg Ser
                85                  90                  95

Val Val Pro Leu Asn Leu Trp Thr Cys Val Asn Cys Leu Arg Phe Ala
            100                 105                 110

Pro Asp Gly Lys Leu Ile Lys Thr Phe Ser Ser Val Ile Ser Asp Thr
        115                 120                 125

Asn Gly Phe Val Leu Arg Ser Asp Ala Gln Lys Thr Ile Tyr Val Val
    130                 135                 140

Phe Arg Gly Thr Asn Ser Ile Arg Ser Ala Ile Thr Asp Leu Val Phe
145                 150                 155                 160

Thr Leu Ile Ser Tyr Pro Pro Val Ser Gly Ala Arg Val His Thr Gly
                165                 170                 175

Phe Tyr Ala Ser Tyr Gln Ala Val Val Ser Asp Tyr Phe Pro Val Val
```

```
            180             185             190
Gln Ser Gln Leu Thr Ser Tyr Pro Ser Tyr Lys Val Val Thr Gly
        195                 200                 205
His Ser Leu Gly Gly Ala His Ala Leu Leu Ala Gly Met Asp Leu Tyr
210                 215                 220
Gln Arg Glu Lys Arg Leu Thr Ala Ser Asn Leu Phe Ile His Thr Ala
225                 230                 235                 240
Gly Cys Pro Arg Val Gly Asn Pro Thr Phe Ala Asn Tyr Val Ala Ser
                245                 250                 255
Thr Gly Ile Thr Phe Thr Arg Ser Val Asn Gln Arg Asp Ile Val Pro
                260                 265                 270
His Val Pro Pro Thr Tyr Ala Gly Tyr Leu His Pro Gly Val Glu Val
                275                 280                 285
Trp Ala Arg Thr Ser Ser Thr Val Gln Ile Cys Thr Ser Asn Thr Glu
                290                 295                 300
Ser Asn Met Cys Ser Asn Ser Ile Glu Pro Phe Thr Ser Phe Thr Asp
305                 310                 315                 320
His Leu Ser Tyr Tyr Gly Ile Thr Glu Gly Val Cys Ile
                325                 330

<210> SEQ ID NO 7
<211> LENGTH: 287
<212> TYPE: PRT
<213> ORGANISM: Penicillium camemberti
<223> OTHER INFORMATION: "> SEQ ID NO: 7"
<223> OTHER INFORMATION: > SEQ ID NO: 7
<220> FEATURE:
<223> OTHER INFORMATION: > SEQ ID NO: 7
<220> FEATURE:
<223> OTHER INFORMATION: > SEQ ID NO: 7

<400> SEQUENCE: 7

Ser Pro Val Gln Leu Ala Arg Arg Ala Ile Ser Ser Glu Leu Leu Glu
1               5                   10                  15
Arg Phe Thr Leu Phe Ser Gln Phe Ala Thr Leu Ser Ala Cys Asp Gln
                20                  25                  30
Asn Ile Asn His Thr Gly Gln Ser Leu Thr Cys Asp Tyr Gly Thr Cys
            35                  40                  45
Gly Leu Val Ala Ala Asp Asn Thr Thr Val Ile Asn Ala Phe His Ser
        50                  55                  60
Asp Asn Gly Pro Thr Gly Tyr Ile Ala Leu Asp His Thr Arg Gln Leu
65                  70                  75                  80
Ile Val Leu Thr Phe Arg Gly Thr Val Ser Lys Ser Asp Gly Asp Thr
                85                  90                  95
Asp Leu Asp Ile Val Leu Thr Ser Ile Asp Asp Val Cys Thr Gly Cys
                100                 105                 110
Lys Ala His His Gly Phe Trp Val Tyr Trp Ser Ala Val Ala Ser Gln
            115                 120                 125
Ala Thr Thr Gln Leu Gln Asp Ala Thr Ser Ala Tyr Pro Ser Tyr Arg
        130                 135                 140
Leu Ser Val Val Gly His Ser Leu Gly Gly Gly Ile Ala Ala Leu Ala
145                 150                 155                 160
Gly Thr Val Leu Arg Thr Gln Gly Phe Thr Leu Asp Ile Trp Thr Phe
                165                 170                 175
Gly Gly Pro Lys Pro Gly Asn Leu Lys Leu Ala Glu Phe Ile Thr Asn
                180                 185                 190
```

```
Gln Gln Pro Pro Asn Ser Ile Tyr Arg Ala Thr His Thr Asp Pro
            195                 200                 205

Ile Pro Lys Val Pro Leu Asn Leu Pro Phe Leu Asp Trp Ser Gln Pro
    210                 215                 220

Ser Pro Glu Tyr Trp Ile Thr Gln Glu Thr Gly Val Gln Val Thr Thr
225                 230                 235                 240

Asp Gly Val Glu Tyr Ile Glu Gly Ile Asn Ser Lys Ala Gly Asn Ala
                245                 250                 255

Gly Ser Asp Arg Asp Leu Arg Trp Pro Asn Pro Glu His Gly Trp Tyr
            260                 265                 270

Phe Gly Asn Met Ser Val Cys Ala Ser Pro Ser Asp Ala Ser Ser
    275                 280                 285
```

<210> SEQ ID NO 8
<211> LENGTH: 275
<212> TYPE: PRT
<213> ORGANISM: Penicillium decumbens
<223> OTHER INFORMATION: "> SEQ ID NO: 8"
<223> OTHER INFORMATION: > SEQ ID NO: 8
<220> FEATURE:
<223> OTHER INFORMATION: > SEQ ID NO: 8
<220> FEATURE:
<223> OTHER INFORMATION: > SEQ ID NO: 8

<400> SEQUENCE: 8

```
Ala Pro Ser Gln Leu Val Pro Arg Ala Val Ser Ser Gly Thr Leu Asp
1               5                   10                  15

Gln Leu Thr Leu Phe Ala Gln Tyr Ser Ala Ala Ser Tyr Cys Ala Asn
            20                  25                  30

Asn Val Asn Ser Pro Gly Asp Ala Ile Thr Cys Ser Gly Gly Tyr Cys
        35                  40                  45

Pro Lys Leu Gln Ser Ala Gly Val Lys Ser Leu Phe Glu Phe Asp Asp
    50                  55                  60

Ser Thr Glu Phe Gly Asp Val Ala Gly Phe Leu Ser Val Asp Thr Ala
65                  70                  75                  80

Asn Lys Leu Leu Val Leu Ser Phe Arg Gly Ser Arg Thr Ile Ser Asn
                85                  90                  95

Trp Ile Ala Asn Leu Asp Phe Gly Gln Ala Asp Ala Ser Ser Leu Cys
            100                 105                 110

Ile Gly Cys Lys Ala His Ser Gly Phe Leu Lys Ala Trp Thr Val Val
        115                 120                 125

Ser Asp Asp Val Met Pro Pro Leu Val Ser Ala Met Ala Lys Tyr Pro
    130                 135                 140

Gly Phe Arg Leu Val Leu Thr Gly His Ser Phe Gly Gly Ala Val Ala
145                 150                 155                 160

Ala Leu Gly Ala Thr Ala Leu Arg Lys Ala Gly Tyr Lys Leu Asp Leu
                165                 170                 175

Tyr Thr Tyr Gly Gln Pro Arg Val Gly Asn Thr Ala Leu Ala Thr Tyr
            180                 185                 190

Met Thr Asn Gln Gly Ser Met Tyr Arg Val Thr His Ser Asn Asp Ile
        195                 200                 205

Val Pro Lys Leu Pro Pro Leu Leu Gly Tyr Thr His Ala Ser Pro
    210                 215                 220

Glu Tyr Trp Ile Thr Ser Gly Asp Asn Val Ala Val Thr Thr Lys Asp
225                 230                 235                 240

Ile Thr Gln Val Asn Gly Ile Gly Ser Lys Asp Gly Asn Ala Gly Ser
                245                 250                 255
```

```
Asn Gly Asp Ser Ile Pro Ala His Asn Trp Tyr Ile Val Asn Ile Asp
            260                 265                 270

Gly Cys Lys
        275

<210> SEQ ID NO 9
<211> LENGTH: 271
<212> TYPE: PRT
<213> ORGANISM: Penicillium decumbens
<223> OTHER INFORMATION: "> SEQ ID NO: 9"
<223> OTHER INFORMATION: > SEQ ID NO: 9
<220> FEATURE:
<223> OTHER INFORMATION: > SEQ ID NO: 9
<220> FEATURE:
<223> OTHER INFORMATION: > SEQ ID NO: 9

<400> SEQUENCE: 9

Ala Pro Gln Lys Arg Ser Val Ser Ser Thr Val Leu Ala Gln Leu Ser
1               5                   10                  15

Arg Tyr Ala Gln Trp Ser Ala Ala Tyr Cys Ser Gly Asn Thr Ser
            20                  25                  30

Gly Ala Asn Gln Val Val Ser Cys Ser Ala Asn Asn Cys Pro Asp Val
            35                  40                  45

Gln Ala Ser Gly Ala Thr Met Leu Tyr Glu Phe Asp Ser Thr Asn Thr
    50                  55                  60

Tyr Gly Asp Ala Ala Gly Phe Leu Ala Ala Asp Thr Thr Gln Gln Gln
65                  70                  75                  80

Ile Ile Leu Ser Phe Arg Gly Ser Arg Thr Thr Ser Asn Trp Ile Ala
                85                  90                  95

Asn Leu Asp Thr Glu Leu Thr Ser Ser Thr Leu Cys Ser Gly Cys Glu
            100                 105                 110

Val His Gln Gly Phe Trp Leu Asp Tyr Gln Thr Val Ala Ala Thr Leu
        115                 120                 125

Lys Ala Gln Ile Asp Ala Ala Leu Asn Thr Tyr Pro Gly Tyr Ser Leu
    130                 135                 140

Val Val Thr Gly His Ser Leu Gly Gly Ala Leu Ala Met Leu Ala Gly
145                 150                 155                 160

Leu Asp Leu Asn Ser Gln Gly Tyr Ala Pro Thr Ile Tyr Thr Tyr Gly
                165                 170                 175

Gln Pro Arg Val Gly Asn Leu Ala Leu Ala Gln Tyr Ile Thr Asn Val
            180                 185                 190

Gly Asn Gln Trp Arg Val Thr His Ala Asp Asp Ala Val Pro Lys Leu
        195                 200                 205

Pro Pro Arg Leu Phe Gly Phe Ser His Ala Ser Pro Glu Tyr Trp Ile
    210                 215                 220

Thr Ser Gly Asp Asn Val Ala Val Thr Thr Gly Asp Val Thr Val Val
225                 230                 235                 240

Thr Gly Val Asn Ser Leu Gly Gly Asn Asp Gly Thr Leu Thr Ala Ser
                245                 250                 255

Val Ser Ala His Asn Trp Tyr Leu Val Asp Ile Asp Ala Cys Lys
            260                 265                 270

<210> SEQ ID NO 10
<211> LENGTH: 269
<212> TYPE: PRT
<213> ORGANISM: Pleurotus ostreatus
<223> OTHER INFORMATION: "> SEQ ID NO: 10"
<223> OTHER INFORMATION: > SEQ ID NO: 10
```

```
<220> FEATURE:
<223> OTHER INFORMATION: > SEQ ID NO: 10
<220> FEATURE:
<223> OTHER INFORMATION: > SEQ ID NO: 10

<400> SEQUENCE: 10

Ala Pro Ala Leu Pro Leu Glu Val Arg Asp Ser Gly Val Ser Gln Ala
1               5                   10                  15

Val Tyr Asp Asp Leu Val Val Tyr Ala Lys Tyr Ser Ser Ala Val Tyr
            20                  25                  30

Gln Pro Phe Cys Pro Arg Pro Leu Gly Ser Trp Met Ile Lys Ala Phe
        35                  40                  45

Asp Thr Lys Gly Thr Gln Gly Phe Val Ala Arg Asp Ala Arg Lys
    50                  55                  60

Glu Ile Ile Val Ala Phe Arg Gly Ser Phe Glu Ile Val Asp Ile Leu
65                  70                  75                  80

Ile Asp Ile Gln Ile Ile Leu Thr Pro Leu Ser Thr Pro Gly Val Ser
                85                  90                  95

Asn Val Gly Ser Ala Arg Val His Thr Gly Phe Gln Lys Ala Tyr Asn
            100                 105                 110

Phe Val Ile Asp Glu Val Gln Ser Leu Met Lys Ser Gln Ile Asp Ala
            115                 120                 125

Tyr Pro Ser Tyr Lys Leu Val Val Thr Gly His Ser Leu Gly Gly Ala
        130                 135                 140

Val Ala Thr Phe Ala Ala Leu Ala Leu Lys Ser Lys Tyr Pro Ser Lys
145                 150                 155                 160

Ser Leu Arg Leu Phe Thr Tyr Gly Ala Pro Arg Val Gly Asp Ala Ala
                165                 170                 175

Phe Ala Ser Leu Val Glu Ser Arg Leu Gly Ile Asn Asn Ile Tyr Arg
            180                 185                 190

Gly Val His Thr Trp Asp Gly Val Pro Thr Leu Leu Gly Arg Trp Leu
        195                 200                 205

Gly Tyr Arg His Tyr Gly Thr Glu Tyr Trp Gln His Lys Asp Pro Ser
    210                 215                 220

Lys Pro Glu Asn Val Arg Lys Cys Asn Gly Gly Glu Asp Thr Ser Cys
225                 230                 235                 240

Ser Asn Ser Ile Ile Ser Thr Gly Ile Asn Pro Pro His Ala Phe Gln
                245                 250                 255

Phe Gly Gln Val Met Ala Ile Asn Pro Leu Leu Cys Phe
            260                 265

<210> SEQ ID NO 11
<211> LENGTH: 366
<212> TYPE: PRT
<213> ORGANISM: Yarrowia lipolytica
<223> OTHER INFORMATION: ">SEQ ID NO: 11"
<223> OTHER INFORMATION: >SEQ ID NO: 11
<220> FEATURE:
<223> OTHER INFORMATION: >SEQ ID NO: 11
<220> FEATURE:
<223> OTHER INFORMATION: >SEQ ID NO: 11

<400> SEQUENCE: 11

Met Val Ser Phe Gly Ala Arg Ile Lys Asp Phe Phe Ser Val Leu Leu
1               5                   10                  15

Phe Gly Ala Ala Ser Thr Ser Ser Ser Thr Lys Thr Ala Leu Val Ser
            20                  25                  30

Gln Gly Phe Tyr Asp Ala Ala Leu Asp Phe Ser His Leu Ser Asn Ile
```

```
            35                  40                  45
Ala Tyr Cys Val Asn Ala Pro Ile Thr Pro Leu Lys Ser Asp Phe Ser
 50                  55                  60

Cys Gly Gln Ser Cys Val His Phe Pro Asp Ile Glu Leu Val His Ile
 65                  70                  75                  80

Phe Gly Gly Asp Phe Phe Ser Thr Ser Ile Thr Gly Tyr Leu Ala Leu
                 85                  90                  95

Asp His Val Lys Lys Glu Lys Tyr Val Val Phe Arg Gly Thr Phe Ser
                100                 105                 110

Ile Ala Asp Ala Ile Thr Asp Ile Gln Phe Gln Gln Ser Ser Phe Leu
            115                 120                 125

Val Asn Val Pro Ala Leu Asn Thr Phe Thr Ala Asn Asp Thr Ala Pro
130                 135                 140

Glu Ala Gln Ile Asp Cys Lys Gln Cys Lys Ile His Asp Gly Phe Ser
145                 150                 155                 160

Lys Ala Phe Thr Glu Thr Trp His Asn Ile Gly Asp Leu Leu Glu Gln
                165                 170                 175

His Leu Asp Ser Tyr Pro Asp Tyr Gln Leu Tyr Val Thr Gly His Ser
            180                 185                 190

Leu Gly Ala Ala Met Ala Leu Leu Gly Ala Thr Ser Ile Lys Leu Arg
        195                 200                 205

Gly Tyr Asp Pro Ile Leu Ile Asn Tyr Gly Gln Pro Arg Val Gly Asn
210                 215                 220

Lys Ala Phe Ala Asp Tyr Ile Ser Ala Leu Trp Phe Gly Asn Gly Asp
225                 230                 235                 240

Gly Leu Glu Ile Asn Gln Gln Arg Arg Leu Tyr Arg Met Thr His Trp
                245                 250                 255

Asn Asp Val Phe Val Gly Leu Pro Asn Trp Asp Gly Tyr Thr His Ser
            260                 265                 270

Asn Gly Glu Val Tyr Ile Lys Gly Lys Tyr Val Asn Pro Pro Leu Lys
        275                 280                 285

Asp Val Phe Ser Cys Ala Gly Gly Glu Asn Ser Lys Cys Tyr Arg Ser
290                 295                 300

Glu Phe Asn Leu Leu Ala Gln Ile Asn Leu Leu Gln Asn His Leu Cys
305                 310                 315                 320

Tyr Ile Asp Tyr Ile Gly Phe Cys Ala Leu Asn Val Gly Arg Arg Glu
                325                 330                 335

Leu Asn Asp Leu Pro His Tyr Asn Gly Pro Tyr Lys Tyr Gly His Lys
            340                 345                 350

Thr Glu Glu Gln Phe Ile Ala Glu Gly Leu Glu Leu Ser Asn
        355                 360                 365

<210> SEQ ID NO 12
<211> LENGTH: 1047
<212> TYPE: DNA
<213> ORGANISM: Yarrowia lipolytica
<223> OTHER INFORMATION: ">SEQ ID NO: 12"
<223> OTHER INFORMATION: ">SEQ ID NO: 12"
<220> FEATURE:
<223> OTHER INFORMATION: >SEQ ID NO: 12
<220> FEATURE:
<223> OTHER INFORMATION: >SEQ ID NO: 12

<400> SEQUENCE: 12
atggttttgt ctactgttat tggtgaatgg ttctctagag ttttgtttgg tactgttgct    60
ccatctcctt tgactgctac tgctccaatc tctcaagatt tctacgatac tgctttgact   120
```

```
ttttctcatt tgtctaacgt tgcttactgt atcaacactc cattggaatc tttgaagtct    180
gatttctctt gtggtgttgc ttgttctcac tttcctaaca tggagttggt tgaagagttc    240
ggtggtgaat ttttcgagac ttctattact ggtttcttgt ctatcgatca tgttaagaaa    300
gagaagtacg ttgtttacag aggtacttac gatatcggag atgtttacac tgatatccaa    360
ttgtctcaat ctccattctt ggttactcct tctgctttgg gttctactgc taatttgtgt    420
gaaggttgta ctattcacga tggttggaac aaggcttata atgagactat gggtattatt    480
ggagataaat tggctgatca tgttaactct aatcctgatt acagattggt tgttactggt    540 cactcttttgg gtgctgctat tgctgttttg tctgctactt ctttgaaggt taacggtcaa    600
gatccatact tgtatactta cggtcaacct agaatcggta acgctaactt cgctaacttc    660
gtttctaagc aatggtttgg tgaaggagat ggttttgtcta tggattctga tagaagatac    720
ttcagattga ctcattggaa cgatttgttt gttggtttcc cagcttttaa ggattacgtt    780
cactctgttg gtgaaatcta catcgattac ttcactgttc aaccacctttt gaacaaggtt    840 ttctcttgtg ctggtcctga gtctatgtct tgttacagaa aggatttcaa cgctttggct    900
agattggata tcgttaaaaa tcatttggct tacttcgatt ggatttcttt gtgtactttg    960
aacattggta gaagagattt ggaaagaggt agaaagtttg agggtacttg gttgtatggt   1020
ggtttggcta atggttctac tattttc                                        1047

<210> SEQ ID NO 13
<211> LENGTH: 921
<212> TYPE: DNA
<213> ORGANISM: Yarrowia lipolytica
<223> OTHER INFORMATION: ">SEQ ID NO: 13"
<223> OTHER INFORMATION: ">SEQ ID NO: 13"
<220> FEATURE:
<223> OTHER INFORMATION: >SEQ ID NO: 13
<220> FEATURE:
<223> OTHER INFORMATION: >SEQ ID NO: 13

<400> SEQUENCE: 13
gctgttttgc aaaagagagt ttacacttct actgaaactt ctcatatcga tcaagaatct     60
tacaactttt tcgagaagta tgctagattg gctaatattg gttattgtgt tggtccaggt    120
actaagattt ttaagccttt caactgtggt ttgcaatgtg ctcatttccc aaacgttgaa    180
ttgatcgaag agtttcacga tcctagattg attttcgatg tttctggtta cttggctgtt    240
gatcatgctt ctaagcaaat ctacttggtt attagaggta ctcactcttt ggaggatgtt    300
atcactgata tcagaatcat gcaagctcca ttgactaact tgatttggc tgctaatatt    360 tcttctactg ctacttgtga tgattgtttg gttcacaacg gtttcattca atcttacaac    420
aacacttaca atcaaattgg tccaaagttg gattctgtta ttgagcaata ccctgattat    480
caaattgctg ttactggtca ttcttttggt ggtgctgctg cttttgttgt tcggtattaac    540 ttgaaggtta atgatcacga tccattggtt gttactttgg gtcaacctat tgttggtaac    600
gctggtttcg ctaattgggt tgataagttg ttttttcggtc aagaaaaccc agatgtttct    660
aaggttctta aggatagaaa gttgtacaga atcactcata gaggagatat tgttccacaa    720 gttcctttttt gggatggtta tcaacattgt tctggagagg ttttcattga ttggcctttg    780
attcacccac ctttgtctaa tgttgttatg tgtcaaggtc aatctaacaa acaatgttct    840
gctggtaaca ctttgttgca acaagttaac gttattggta atcacttgca atacttcgtt    900
actgaaggtg tttgtggtat t                                              921
```

```
<210> SEQ ID NO 14
<211> LENGTH: 1041
<212> TYPE: DNA
<213> ORGANISM: Yarrowia lipolytica
<223> OTHER INFORMATION: ">SEQ ID NO: 14"
<223> OTHER INFORMATION: ">SEQ ID NO: 14"
<220> FEATURE:
<223> OTHER INFORMATION: >SEQ ID NO: 14
<220> FEATURE:
<223> OTHER INFORMATION: >SEQ ID NO: 14

<400> SEQUENCE: 14
caaactgctc caatcactca agaaacttac gatttcgttt tgaagtacgg ttggttgtct      60
aacgttgctt actgtgttag agctccaggt cctttttgctt tgcaatctga tttcacttgt   120
ggtaactctt gtgctcattt ccctgatgtt actttggatt accaattcgg tggtaacttt    180
ttctctactt ctgttactgg tttcttggct cacgatcaca ctaagaaaga aaagtacatc    240 gttttagag gtactttctc tatcgctgat gctattactg atatccaaac tatccaacaa    300
ccatacatga cttctattcc acctttgaac actactgata tcaactctac taatccatct    360
gcttctatta attgtcctgg ttgtcaagtt cacgatggtt tcaaaaagc ttacagagag    420 actatggtta acgttcaaga tagattggtt gatttcttgg gtaacaacac tgattacaag    480
ttgatcgtta ctggtcactc tttgggtgct gttactgctt tgtttatggg tattaacttg    540
aaaaatttgg gttacgatcc aactttgatt aactatggtc aacctagatt gggtaataag    600
gctttcgctg attacgttga tgctttgttt ttcaaacaag agatgatgg tttgactatt     660 aacccagaaa aagaatgta cagagttact cattggaacg atttctttgt tggttggcct    720
gctggttact ctcacacttt gggtgaagtt tatatttctg acccaactgg tattaacgct    780
cctattgaag atgtttactc ttgtgctggt ccagagaaca atcaatgtca tcacggttct    840
tttaatttgt tggaaagatt gaacatcttg aagaatcatt gtggttactt gaactggatt    900
ttctattgtg ctattaatgt tgataagaga gaaatgatga ttgatccacc tagagttggt    960
aaaagagttg agcactggtc tggtaaattt tctgatgttg aatctactga gggtttgatg   1020
tacgaggcta tctaccctat g                                             1041

<210> SEQ ID NO 15
<211> LENGTH: 837
<212> TYPE: DNA
<213> ORGANISM: Aspergillus niger
<223> OTHER INFORMATION: ">SEQ ID NO: 15"
<223> OTHER INFORMATION: ">SEQ ID NO: 15"
<220> FEATURE:
<223> OTHER INFORMATION: >SEQ ID NO: 15
<220> FEATURE:
<223> OTHER INFORMATION: >SEQ ID NO: 15

<400> SEQUENCE: 15
gctccagctc ctgctccaat gcaaagaaga gatatctctt ctactgtttt ggataacatc      60
gatttgttcg ctcaatactc tgctgctgct tattgttctt ctaacattga atctactggt    120
actactttga cttgtgatgt tggtaattgt ccctttggttg aagctgctgg tgctactact    180
atcgatgagt tcgatgattc ttcttcttac ggagatccta ctggtttcat tgctgttgat    240
ccaactaacg agttgattgt tttgtcttttt agaggttctt ctgatttgtc taattggatt    300
gctgatttgg atttcggttt gacttctgtt tcttctatttt tgtgatggttg tgaaatgcat    360 aagggttttt acgaagcttg ggaggttatt gctgatacta tcacttctaa ggttgaggct    420
gctgtttctt cttaccctga ttatactttg gttttcactg gtcactctta tggtgctgct    480
```

```
ttggctgctg ttgctgctac tgttttgaga aatgctggtt acactttgga tttgtataac      540
tttggtcaac caagaattgg taatttggct ttggctgatt acatcactga tcaaaacatg      600
ggttctaact acagagttac tcatactgat gatattgttc ctaagttgcc acctgaattg      660
ttgggttacc atcactttc tccagagtat tggattactg ctggtaacga tgttactgtt       720
actacttctg atgttactga agttgttggt gttgattcta ctgctggtaa tgatggtact      780
ttgttggatt ctactactgc tcacagatgg tacactatct acatttctga gtgttct         837
```

```
<210> SEQ ID NO 16
<211> LENGTH: 783
<212> TYPE: DNA
<213> ORGANISM: Aspergillus niger
<223> OTHER INFORMATION: ">SEQ ID NO: 16"
<223> OTHER INFORMATION: ">SEQ ID NO: 16"
<220> FEATURE:
<223> OTHER INFORMATION: >SEQ ID NO: 16
<220> FEATURE:
<223> OTHER INFORMATION: >SEQ ID NO: 16

<400> SEQUENCE: 16
```

```
gttccaatgt tgcaatctag agctacttct gatcctgctg aatggactga gttgcataga       60
gctgctcaat tgtcttctgc tgcttacact ggttgtactg gttctgcttt cgatgttact      120
atcactaagc aaattaacga attggttact gatactcaag gtttcattgg ttactctact      180
gagaagaaaa gaatcactgt tgctatgaga ggttctactt ctgctactga tattgctaac      240
gatgttgata ctactttggt tgaaccaact tgtctggtg ttaattttcc ttctggtgct       300
aagatgatgc atggtatcta ctctccatgg tcttctgttc acgatgatgt tatctctgag      360
gttaagtctt tggttgagca ataccctgat tatactattg aatctactgg tcactctttg      420
ggtggttctt tgacttacat ctcttacatc gctttggctc aaaacttccc aggtaaaact      480
atcatctcta acgctttggc tgcttatcct attggtaacg aggcttttgc taatttcggt      540
gcttctcaaa acggtacttt gaatcgtggt aacaatgctg atgatggtgt tccaaatatg      600
tacgttatgt ggccttggga tttcgttcat tacggtactg aatactactc ttctggtact      660
caagcttcta ctgttaaatg ttctggagag agagatactt cttgttctgc tggtaacggt      720
caagttggtg ttactgctgg tcactttct aatttcggta ttgctatggg tatggctggt      780
tgt                                                                     783
```

```
<210> SEQ ID NO 17
<211> LENGTH: 999
<212> TYPE: DNA
<213> ORGANISM: Mucor javanicus
<223> OTHER INFORMATION: ">SEQ ID NO: 17"
<223> OTHER INFORMATION: ">SEQ ID NO: 17"
<220> FEATURE:
<223> OTHER INFORMATION: >SEQ ID NO: 17
<220> FEATURE:
<223> OTHER INFORMATION: >SEQ ID NO: 17

<400> SEQUENCE: 17
```

```
gctcctgctt ctaatgatgc tactattgct gatgtttctt ctactttcac tttgccacct       60
attattaagg atagagttgc ttttctaac gatatcgctg atactgatta cttcaacttg       120
actaagagag cttctgaaac tgttggtggt aatactatgg atttgccatc taacgctcca      180
gctttgcctg ctgttccaaa ggctggagat gttgttattg ctactgctgc tcaaattgct      240
gagtacaaga aatatgctgc tttggcttct actgcttact gtagatctgt tgttcctttg      300
```

| | | | | |
|---|---|---|---|---|
| aatttgtgga | cttgtgttaa | ctgtttgaga | tttgctccag | atggtaaatt gattaaaact | 360 |
| ttctcttctg | ttatttctga | tactaacggt | ttcgttttga | gatctgatgc tcaaaagact | 420 |
| atctacgttg | ttttcagagg | tactaactct | atcagatctg | ctatcactga tttggttttt | 480 |
| actttgatct | cttacccacc | tgtttctggt | gctagagttc | atactggttt ctacgcttct | 540 |
| tatcaagctg | ttgtttctga | ttactttcct | gttgttcaat | ctcaattgac ttcttaccca | 600 |
| tcttataagg | ttgttgttac | tggtcattct | tgggtggtg  | ctcacgcttt gttggctggt | 660 |
| atggatttgt | accaaagaga | aaagagattg | actgcttcta | atttgtttat tcacactgct | 720 |
| ggttgtccta | gagttggtaa | tccaactttc | gctaactacg | ttgcttctac tggtatcact | 780 |
| tttactagat | ctgttaacca | agagatatt  | gttcctcatg | ttccacctac ttacgctggt | 840 |
| tatttgcacc | caggtgttga | agtttgggct | agaacttctt | ctactgttca aatctgtact | 900 |
| tctaacactg | aatctaacat | gtgttctaac | tctatcgagc | cttttacttc tttcactgat | 960 |
| catttgtctt | actatggtat | tactgagggt | gtttgtatt  | | 999 |

```
<210> SEQ ID NO 18
<211> LENGTH: 861
<212> TYPE: DNA
<213> ORGANISM: Penicillium camemberti
<223> OTHER INFORMATION: ">SEQ ID NO: 18"
<223> OTHER INFORMATION: ">SEQ ID NO: 18"
<220> FEATURE:
<223> OTHER INFORMATION: >SEQ ID NO: 18
<220> FEATURE:
<223> OTHER INFORMATION: >SEQ ID NO: 18

<400> SEQUENCE: 18
```

| | | | | |
|---|---|---|---|---|
| tctccagttc | aattggctag | aagagctatt | tcttctgaat | tgttggagag attcactttg | 60 |
| ttctctcaat | ttgctacttt | gtctgcttgt | gatcaaaaca | tcaaccatac tggtcaatct | 120 |
| ttgacttgtg | attacggtac | ttgtggtttg | gttgctgctg | ataacactac tgttattaat | 180 |
| gctttccatt | ctgataacgg | tcctactggt | tatattgctt | tggatcacac tagacaattg | 240 |
| atcgttttga | cttttagagg | tactgtttct | aagtctgatg | gagatactga tttggatatc | 300 |
| gttttgactt | ctatcgatga | tgtttgtact | ggttgtaaag | ctcatcacgg tttctgggtt | 360 |
| tactggtctg | ctgttgcttc | tcaagctact | actcaattgc | aagatgctac ttctgcttac | 420 |
| ccatcttata | gattgtctgt | tgttggtcat | tcttttgggtg | gtggtattgc tgcttttggct | 480 |
| ggtactgttt | tgagaactca | aggtttcact | ttggatattt | ggacttttgg tggtccaaag | 540 |
| cctggtaact | tgaagttggc | tgaattcatt | actaaccaac | aaccacctaa ttctatctac | 600 |
| agagctactc | acactactga | tccaattcct | aaggttccat | tgaatttgcc atttttggat | 660 |
| tggtctcaac | catctcctga | atactggatt | actcaagaga | ctggtgttca agttactact | 720 |
| gatggtgttg | aatacatcga | gggtattaac | tctaaagctg | gtaatgctgg ttctgataga | 780 |
| gatttgagat | ggccaaaccc | tgagcacggt | tggtattttg | gtaatatgtc tgtttgtgct | 840 |
| tctccttctg | atgcttcttc | t | | | 861 |

```
<210> SEQ ID NO 19
<211> LENGTH: 825
<212> TYPE: DNA
<213> ORGANISM: Penicillium decumbens
<223> OTHER INFORMATION: ">SEQ ID NO: 19"
<223> OTHER INFORMATION: ">SEQ ID NO: 19"
<220> FEATURE:
<223> OTHER INFORMATION: >SEQ ID NO: 19
<220> FEATURE:
<223> OTHER INFORMATION: >SEQ ID NO: 19
```

-continued

<400> SEQUENCE: 19

```
gctccttctc aattggttcc aagagctgtt tcttctggta ctttggatca attgactttg      60
tttgctcaat actctgctgc ttcttattgt gctaacaatg ttaactctcc tggagatgct     120
attacttgtt ctggtggtta ctgtccaaag ttgcaatctg ctggtgttaa gtctttgttc     180
gaattcgatg attctactga gtttggagat gttgctggtt tcttgtctgt tgatactgct     240
aataagttgt tggttttgtc ttttagaggt tctagaacta tctctaactg gatcgctaat     300
ttggatttcg gtcaagctga tgcttcttct ttgtgtattg gttgtaaggc tcattctggt     360
ttcttgaaag cttggactgt tgtttctgat gatgttatgc cacctttggt ttctgctatg     420
gctaaatacc ctggttttag attggttttg actggtcact cttcggtgg tgctgttgct      480
gctttgggtg ctactgcttt gagaaaggct ggttacaagt tggatttgta cacttacggt     540
caaccaagag ttggtaacac tgctttggct acttacatga ctaatcaagg ttctatgtac     600
agagttactc attctaacga tatcgttcct aagttgccac ctccattgtt gggttacact     660
cacgcttctc cagaatattg gattacttct ggagataacg ttgctgttac tactaaggat     720
atcactcaag ttaacggtat cggttctaaa gatggtaacg ctggttctaa tggagattct     780
attcctgctc ataactggta tattgttaat attgatggtt gtaaa                     825
```

<210> SEQ ID NO 20
<211> LENGTH: 813
<212> TYPE: DNA
<213> ORGANISM: Penicillium decumbens
<223> OTHER INFORMATION: ">SEQ ID NO: 20"
<223> OTHER INFORMATION: ">SEQ ID NO: 20"
<220> FEATURE:
<223> OTHER INFORMATION: >SEQ ID NO: 20
<220> FEATURE:
<223> OTHER INFORMATION: >SEQ ID NO: 20

<400> SEQUENCE: 20

```
gctccacaaa agagatctgt tcttctact gttttggctc aattgtctag atacgctcaa       60
tggtctgctg ctgcttattg ttctggtaac acttctggtg ctaatcaagt tgtttcttgt     120
tctgctaaca attgtcctga tgttcaagct tctggtgcta ctatgttgta cgaattcgat     180
tctactaaca cttacggaga tgctgctggt tcttggctg ctgatactac tcaacaacaa      240
atcatcttgt cttttagagg ttctagaact acttctaact ggattgctaa tttggatact     300
gaattgactt cttctacttt gtgttctggt tgtgaggttc atcaaggttt ctggttggat     360
taccaaactt tgctgctac tttgaaagct caaattgatg ctgctttgaa acttaccca       420
ggttattctt tggttgttac tggtcactct ttgggtggtg cttttggctat gttggctggt     480
ttggatttga actctcaagg ttacgctcca actatctaca cttatggtca acctagagtt     540
ggtaatttgg ctttggctca atacatcact aacgttggta accaatggag agttactcat     600
gctgatgatg ctgttccaaa gttgccacct agattgtttg gttctctca cgcttctcct      660
gagtactgga ttacttctgg agataacgtt gctgttacta ctggagatgt tactgttgtt    720
actggtgtta actctttggg tggtaatgat ggtactttga ctgcttctgt ttctgctcat     780
aactggtatt tggttgatat cgatgcttgt aaa                                  813
```

<210> SEQ ID NO 21
<211> LENGTH: 807
<212> TYPE: DNA
<213> ORGANISM: Pleurotus ostreatus
<223> OTHER INFORMATION: ">SEQ ID NO: 21"

<223> OTHER INFORMATION: ">SEQ ID NO: 21"
<220> FEATURE:
<223> OTHER INFORMATION: >SEQ ID NO: 21
<220> FEATURE:
<223> OTHER INFORMATION: >SEQ ID NO: 21

<400> SEQUENCE: 21

```
gctccagctt tgcctttgga agttagagat tctggtgttt ctcaagctgt ttacgatgat      60
ttggttgttt acgctaagta ttcttctgct gtttatcaac cattttgtcc aagacctttg     120
ggttcttgga tgattaaggc ttttgatact aaaggtactc aaggtttcgt tgctagagat     180
gatgctagaa aggaaatcat cgttgctttt agaggttctt tcgagattgt tgatatcttg     240
atcgatatcc aaatcatctt gactccattg tctactcctg gtgtttctaa cgttggttct     300
gctagagttc atactggttt ccaaaaggct tacaacttcg ttatcgatga ggttcaatct     360
ttgatgaagt ctcaaatcga tgcttaccct tcttacaagt tggttgttac tggtcactct     420
ttgggtggtg ctgttgctac tttcgctgct ttggctttga agtctaagta cccatctaag     480
tctttgagat tgtttactta cggtgctcct agagttggag atgctgcttt cgcttctttg     540
gttgaatcta gattgggtat taacaacatc tacagaggtg ttcatacttg gatggtgtt     600
ccaactttgt tgggtagatg gttgggttac agacattatg gtactgagta ttggcaacac     660
aaggatccat ctaaacctga aaacgttaga agtgtaatg gtggagagga tacttcttgt     720
tctaactcta tcatctctac tggtattaat ccacctcacg cttttcaatt cggtcaagtt     780
atggctatta acccttgttt gtgtttt                                         807
```

<210> SEQ ID NO 22
<211> LENGTH: 1098
<212> TYPE: DNA
<213> ORGANISM: Yarrowia lipolytica
<223> OTHER INFORMATION: ">SEQ ID NO: 22"
<223> OTHER INFORMATION: ">SEQ ID NO: 22"
<220> FEATURE:
<223> OTHER INFORMATION: >SEQ ID NO: 22
<220> FEATURE:
<223> OTHER INFORMATION: >SEQ ID NO: 22

<400> SEQUENCE: 22

```
atggtttctt tcggtgctag aattaaggat ttcttttctg ttttgttgtt tggtgctgct      60
tctacttctt cttctactaa aactgctttg gtttctcaag ttttttatga tgctgctttg     120
gatttctctc atttgtctaa catcgcttac tgtgttaacg ctccaattac tccttttgaag    180
tctgatttttt cttgtggtca atcttgtgtt catttcccag atattgaatt ggttcacatt     240
tttggtggag atttcttttc tacttctatc actggttatt tggctttgga tcacgttaag     300
aaagagaagt acgttgtttt tagaggtact ttctctatcg ctgatgctat cactgatatc     360
caattccaac aatcttcttt cttggttaac gttccagctt tgaatacttt cactgctaac     420
gatactgctc ctgaagctca aatcgattgt aagcagtgta agattcacga tggtttttct     480
aaggctttca ctgaaacttg gcataacatt ggagatttgt tggagcaaca cttggattct     540
tacccagatt atcaattgta cgttactggt cactctttgg gtgctgctat ggctttgttg     600
ggtgctactt ctattaagtt gagaggttac gatccaatct tgattaatta cggtcaacct     660
agagttggta caaagctttt cgctgattat atttctgctt tgtggtttgg taatggagat     720
ggtttggaaa ttaaccaaca aagaagattg tacagaatga ctcattggaa cgatgttttc     780
gttggtttgc ctaactggga tggttacact cactctaacg gagaggttta catcaagggt     840
aaatacgtta acccacccttt gaaggatgtt ttctcttgtg ctggtggtga aaactctaag     900
```

```
tgttacagat ctgagtttaa tttgttggct caaattaact tgttgcaaaa ccatttgtgt      960
tacatcgatt acatcggttt ctgtgctttg aacgttggta gaagagagtt gaatgatttg     1020
ccacattaca acggtcctta caagtatggt cacaaaactg aagagcaatt cattgctgaa     1080
ggtttggagt tgtctaat                                                   1098

<210> SEQ ID NO 23
<211> LENGTH: 1047
<212> TYPE: DNA
<213> ORGANISM: Artificial Sequence
<223> OTHER INFORMATION: ">SEQ ID NO: 23"
<220> FEATURE:
<223> OTHER INFORMATION: >SEQ ID NO: 23

<400> SEQUENCE: 23
atggtcctgt ccactgttat cggagaatgg ttttcaagag ttttgtttgg tactgtcgcc       60
ccatcaccac tcaccgccac agcccccatt tctcaggact tctacgatac cgctctcacg      120
ttctctcacc tatctaatgt tgcttactgt atcaacaccc ctcttgagtc cctcaagtcc      180
gacttttcct gcggtgtcgc atgttctcac ttcccaaaca tggaacttgt tgaagagttc      240
ggtggagaat ttttcgaaac ttctattact ggttttctat ctatcgacca tgtcaaaaag      300
gaaaagtacg ttgtgtacag aggcacctat gacattggtg acgtttatac tgacattcaa      360
ttaagccaat ccccattctt ggttacccct tctgccctgg gttctacagc aaatctgtgt      420
gagggttgta ctatccacga tggttggaac aaagcataca acgaaaccat gggtattatc      480
ggagacaagc tcgctgacca cgttaactcc aacccagatt acagattggt cgtaactgga      540
cattcacttg gtgctgctat tgctgtacta tctgcaacct ctcttaaggt caatggccaa      600
gatccttacc tttacactta cggtcagcct cgtattggta atgctaactt cgcaaacttt      660
gtgagtaagc aatggttcgg tgagggtgac ggtctatcta tggactcgga cagacgttat      720
ttcagactga ctcactggaa cgacctcttt gttggtttcc ctgctttcaa ggactacgtg      780
cactctgtcg gagagattta catagactat ttcaccgttc aaccaccact caacaaagtt      840
ttctcttgtg ctgggcctga gtctatgtcc tgttacagaa aggacttcaa cgcccttgct      900
agacttgata ttgtgaaaaa ccacctagct tacttcgatt ggatctctct gtgcaccctc      960
aacatcggca gacgtgatct ggagaggggt agaaagttcg agggtacttg gctctacggt     1020
ggactggcta acggatccac tatcttc                                         1047
```